United States Patent
Okubo et al.

(10) Patent No.: US 10,092,880 B2
(45) Date of Patent: Oct. 9, 2018

(54) SPIRAL-WOUND ACID GAS SEPARATION MEMBRANE ELEMENT, ACID GAS SEPARATION MEMBRANE MODULE, AND ACID GAS SEPARATION APPARATUS

(71) Applicant: SUMITOMO CHEMICAL COMPANY, LIMITED, Tokyo (JP)

(72) Inventors: Yoshihito Okubo, Osaka (JP); Atsushi Shudo, Tokyo (JP); Yudai Ota, Osaka (JP); Shohei Kasahara, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/577,083

(22) PCT Filed: May 27, 2016

(86) PCT No.: PCT/JP2016/065776
§ 371 (c)(1),
(2) Date: Nov. 27, 2017

(87) PCT Pub. No.: WO2016/194833
PCT Pub. Date: Dec. 8, 2016

(65) Prior Publication Data
US 2018/0178166 A1 Jun. 28, 2018

(30) Foreign Application Priority Data
May 29, 2015 (JP) .................................. 2015-110487

(51) Int. Cl.
*B01D 53/22* (2006.01)
*B01D 63/10* (2006.01)
(Continued)

(52) U.S. Cl.
CPC ........... *B01D 63/10* (2013.01); *B01D 53/228* (2013.01); *B01D 63/00* (2013.01); *B01D 65/003* (2013.01);
(Continued)

(58) Field of Classification Search
CPC .... B01D 69/12; B01D 63/10; B01D 2313/23; B01D 65/003; B01D 2323/02;
(Continued)

(56) References Cited

U.S. PATENT DOCUMENTS 4,582,726 A * 4/1986 Shuey .................... B01D 63/10
156/329
5,264,171 A * 11/1993 Prasad ................... B01D 53/22
264/103
(Continued)

FOREIGN PATENT DOCUMENTS

CN 101322918 A 12/2008
CN 101384341 A 3/2009
(Continued)

OTHER PUBLICATIONS

Richard W. Baker, "Future Directions of Membrane Gas Separation Technology," Ind. Eng. Chem. Res., 2002, vol. 41, pp. 1393-1411.
(Continued)

*Primary Examiner* — Anthony R Shumate
(74) *Attorney, Agent, or Firm* — Sughrue Mion, PLLC

(57) ABSTRACT

A spiral-wound acid gas separation membrane element (1) includes a wound body which includes a laminate and a perforated core (5), the laminate being wound around the perforated core tube (5) and including: a separation membrane (2), a feed-side channel component (3), and an element constituent layer (e.g., permeate-side channel component (4)). The separation membrane (2) is provided with a sealing section (25) present at both widthwise ends of the (Continued)

separation membrane (2). The sealing section (25) is sealed with an adhesive. This makes it possible not only to separate acid gas from mixed gas more efficiently as compared to a conventional spiral-wound acid gas separation membrane element but also to save energy.

20 Claims, 9 Drawing Sheets

(51) Int. Cl.
    *B01D 63/00* (2006.01)
    *B01D 69/10* (2006.01)
    *B01D 69/12* (2006.01)
    *B01D 71/32* (2006.01)
    *B01D 65/00* (2006.01)
    *B01D 71/40* (2006.01)

(52) U.S. Cl.
    CPC ............ *B01D 69/10* (2013.01); *B01D 69/12* (2013.01); *B01D 71/32* (2013.01); *B01D 71/40* (2013.01); *B01D 2053/221* (2013.01); *B01D 2313/04* (2013.01); *B01D 2313/23* (2013.01); *B01D 2323/02* (2013.01)

(58) Field of Classification Search
    CPC ............ B01D 53/228; B01D 2053/221; B01D 2313/04; B01D 71/40
    See application file for complete search history.

(56) References Cited

U.S. PATENT DOCUMENTS

| | | | | |
|---|---|---|---|---|
| 6,068,771 | A * | 5/2000 | McDermott | B01D 63/10 156/187 |
| 6,432,310 | B1 * | 8/2002 | Andou | B01D 61/022 210/321.74 |
| 9,700,833 | B2 * | 7/2017 | Ouchi | B01D 53/22 |
| 9,808,765 | B2 * | 11/2017 | Kahle | B01D 61/025 |
| 2002/0027111 | A1 * | 3/2002 | Ando | B01D 61/142 210/791 |
| 2004/0099598 | A1 * | 5/2004 | Cheng | B01D 63/10 210/321.85 |
| 2006/0131235 | A1 | 6/2006 | Offeman et al. | |
| 2008/0084274 | A1 * | 4/2008 | Ohashi | G06K 19/07718 340/10.1 |
| 2008/0302719 | A1 | 12/2008 | Chikura et al. | |
| 2009/0026130 | A1 | 1/2009 | Chikura et al. | |
| 2009/0255877 | A1 * | 10/2009 | Bair | B01D 63/10 210/739 |
| 2011/0084013 | A1 * | 4/2011 | Lesan | B01D 63/106 210/232 |
| 2011/0168627 | A1 * | 7/2011 | Lim | B01D 61/027 210/500.21 |
| 2011/0266210 | A1 | 11/2011 | Chikura et al. | |
| 2013/0098830 | A1 * | 4/2013 | Muraki | B01D 63/103 210/457 |
| 2013/0098831 | A1 * | 4/2013 | Shrikhande | B01D 63/10 210/460 |
| 2015/0014232 | A1 * | 1/2015 | McGinnis | B01D 61/364 210/180 |
| 2015/0053351 | A1 * | 2/2015 | Tanaka | B65H 35/0026 156/538 |
| 2015/0151244 | A1 | 6/2015 | Ishizuka | |
| 2015/0165384 | A1 | 6/2015 | Aburaya | |
| 2015/0283518 | A1 | 10/2015 | Hirose et al. | |
| 2015/0336056 | A1 | 11/2015 | Ouchi | |
| 2016/0023164 | A1 * | 1/2016 | Karode | B01D 65/003 96/8 |
| 2016/0136572 | A1 | 5/2016 | Narita et al. | |
| 2016/0136580 | A1 | 5/2016 | Narita et al. | |
| 2017/0001154 | A1 * | 1/2017 | Marutani | B01D 63/10 |
| 2017/0056833 | A1 * | 3/2017 | Nguyen | B01D 67/0086 |

FOREIGN PATENT DOCUMENTS

| | | |
|---|---|---|
| CN | 104379235 A | 2/2015 |
| CN | 104619402 A | 5/2015 |
| JP | S59-073008 A | 4/1984 |
| JP | H03-068428 A | 3/1991 |
| JP | H03-106421 A | 5/1991 |
| JP | H03-143532 A | 6/1991 |
| JP | 6-246124 A | 9/1994 |
| JP | H06-319965 A | 11/1994 |
| JP | 2006-218345 A | 8/2006 |
| JP | 2006-255672 A | 9/2006 |
| JP | 2008-043824 A | 2/2008 |
| JP | 5443773 B2 | 3/2014 |
| JP | 2014-94369 A | 5/2014 |
| JP | 2014-140837 A | 8/2014 |
| JP | 2014-161746 A | 9/2014 |
| JP | 5598630 B1 | 10/2014 |
| JP | 2015-044187 A | 3/2015 |
| JP | 2015-044189 A | 3/2015 |
| WO | 2016/194832 A1 | 12/2016 |

OTHER PUBLICATIONS

International Search Report of PCT/JP2016/065776, dated Jul. 12, 2016.
International Preliminary Report on Patentability of PCT/JP2016/065776, dated Dec. 14, 2017.

* cited by examiner

US 10,092,880 B2

SPIRAL-WOUND ACID GAS SEPARATION MEMBRANE ELEMENT, ACID GAS SEPARATION MEMBRANE MODULE, AND ACID GAS SEPARATION APPARATUS

CROSS REFERENCE TO RELATED APPLICATIONS

This application is a National Stage of International Application No. PCT/JP2016/065776 filed May 27, 2016, claiming priority based on Japanese Patent Application No. 2015-110487 filed May 29, 2015, the contents of all of which are incorporated herein by reference in their entirety.

TECHNICAL FIELD

The present invention relates to a spiral-wound acid gas separation membrane element, an acid gas separation membrane module, and an acid gas separation apparatus each configured to separate acid gas from mixed gas including at least acid gas.

BACKGROUND ART

A gas membrane-separation process is a process of separating acid gas such as carbon dioxide ($CO_2$) from such mixed gas including at least acid gas as (i) synthesis gas synthesized in a large-scale plant that produces, for example, hydrogen and/or urea, (ii) natural gas, and (iii) exhaust gas. The gas membrane-separation process can save energy, and has attracted attention in recent years.

There have been proposed various gas separation membranes and membrane-separation apparatuses for use in the gas membrane-separation process. For example, Patent Literature 1 discloses a carbon dioxide separation apparatus, and Patent Literature 2 discloses a carbonic acid gas separation membrane.

A known example of an acid gas separation membrane element including a gas separation membrane is a spiral-wound acid gas separation membrane element. A spiral-wound acid gas separation membrane element includes (i) a wound body including a separation membrane, a feed-side channel component, and a permeate-side channel component that are wound in a laminated state around a core tube having a plurality of holes and (ii) a sealing section configured to prevent mixing of mixed gas (feed-side fluid) and permeation gas (permeate-side fluid).

Such a conventional spiral-wound acid gas separation membrane element often employs, as a technique for forming the sealing section, a method in which an adhesive is caused to penetrate into a member constituting the membrane element. For example, Patent Literature 3 reports that a seal is provided to an area where a seal is necessary in a reinforcement member sheet, by causing an adhesive to penetrate the area in a direction from a reinforcement member sheet side to a gas permeable sheet side in a depth direction.

CITATION LIST

Patent Literature 1
Japanese Patent Publication No. 5443773 (Publication Date: Mar. 19, 2014)
Patent Literature 2
Japanese Patent Publication No. 5598630 (Publication Date: Oct. 1, 2014)
Patent Literature 3
Japanese Patent Application Publication, Tokukai, No. 2014-94369 A (Publication Date: May 22, 2014)

SUMMARY OF INVENTION

Technical Problem

However, in a conventionally proposed sealing technique for spiral-wound acid gas separation membrane elements, there has been a problem of compatibility of a member into which an adhesive is caused to penetrate with the adhesive. Accordingly, there has been a limit to types of the member, types of the adhesive, and combinations of the member and the adhesive. On this account, there has been a demand for development of a sealing technique which can be used more generally regardless of types of the member, types of the adhesive, and combinations of the member and the adhesive.

A main object of the present invention is to provide a novel sealing technique. Another object of the present invention is to provide a spiral-wound acid gas separation membrane element, an acid gas separation membrane module, and an acid gas separation apparatus each of which achieves, by use of the novel sealing technique, higher gas tightness than conventional one. In addition, still another object of the present invention is to provide a spiral-wound acid gas separation membrane element, an acid gas separation membrane module, and an acid gas separation apparatus each of which can not only separate acid gas from mixed gas including at least the acid gas more efficiently than conventional one but also save energy.

Solution to Problem

In order to solve the above problem, the present invention encompasses the following inventions.

<1> A spiral-wound acid gas separation membrane element including: a wound body including: a separation membrane; a feed-side channel component; a permeate-side channel component; a sealing section; and a perforated core tube, the separation membrane, the feed-side channel component, and the permeate-side channel component being in a laminated state and wound around the perforated core tube, the separation membrane including: a separate functional layer including: an acid gas carrier that reversibly reacts with acid gas; and an acid gas separation membrane resin; and a support layer including a porous membrane, the permeate-side channel component being greater at least in an across-the-width direction of the permeate-side channel component than the separation membrane, and the sealing section being provided at each of both widthwise ends of the separation membrane, for filling in a gap formed between the permeate-side channel component and the separation membrane.

<2> The spiral-wound acid gas separation membrane element according to <1>, further including at least one selected from the group consisting of: at least one protective layer provided between the separation membrane and the feed-side channel component; and at least one reinforcement porous membrane provided as a layer on a permeate side of the separation membrane.

<3> The spiral-wound acid gas separation membrane element according to <1> or <2>, wherein the sealing section is an adhesive layer.

<4> The spiral-wound acid gas separation membrane element according to <3>, wherein the adhesive layer contains an epoxy adhesive resin.

<5> The spiral-wound acid gas separation membrane element according to any one of <1> to <4>, wherein the support layer is a porous membrane made of a fluorine-containing resin.

<6> The spiral-wound acid gas separation membrane element according to any one of <1> to <5>, further including another sealing section into which an adhesive has been caused to penetrate, the another sealing section being provided in both widthwise-end continuous areas of an element constituent layer, the widthwise-end continuous areas each extending from a corresponding widthwise end of the element constituent layer and reaching a corresponding one of imaginary lines obtained by extending in a thickness direction widthwise ends of the separation membrane, the element constituent layer including at least one selected from the group consisting of the permeate-side channel component, at least one protective layer provided between the separation membrane and the feed-side channel component, and at least one reinforcement porous membrane provided as a layer on a permeate side of the separation membrane.

<7> The spiral-wound acid gas separation membrane element according to <6>, wherein in the another sealing section, the adhesive has been caused to penetrate into inner areas in a width direction beyond the imaginary lines obtained by extending in a thickness direction the widthwise ends of the separation membrane.

<8> The spiral-wound acid gas separation membrane element according to any one of <1> to <7>, wherein the protective layer has widthwise ends treated with a hydrophilic treatment agent.

<9> The spiral-wound acid gas separation membrane element according to any one of <1> to <8>, further including still another sealing section into which an adhesive has been caused to penetrate, in widthwise-end areas of the support layer.

<10> The spiral-wound acid gas separation membrane element according to <9>, wherein the still another sealing section is treated with a hydrophilic treatment agent.

<11> The spiral-wound acid gas separation membrane element according to any one of <8> or <10>, wherein the hydrophilic treatment agent is a surface active agent.

<12> An acid gas separation membrane module including: at least one spiral-wound acid gas separation membrane element according to any one of <1> to <11>; and a housing, the at least one spiral-wound acid gas separation membrane element being provided in the housing.

<13> An acid gas separation apparatus including at least one acid gas separation membrane module according to <12>.

<14> A sealing method used for a spiral-wound acid gas separation membrane element including a wound body, the wound body including: a separation membrane; a feed-side channel component; a permeate-side channel component; a sealing section; and a perforated core tube, the separation membrane, the feed-side channel component, and the permeate-side channel component being in a laminated state and wound around the perforated core tube, the separation membrane including: a separate functional layer including: an acid gas carrier that reversibly reacts with acid gas; and an acid gas separation membrane resin; and a support layer including a porous membrane, the sealing method including the step of: applying an adhesive to both widthwise ends of the separation membrane so as to fill in a gap formed between the permeate-side channel component and the separation membrane, the permeate-side channel component being greater at least in an across-the-width direction of the permeate-side channel component than the separation membrane.

<15> The sealing method as set forth in <14>, wherein the spiral-wound acid gas separation membrane element further includes at least one selected from the group consisting of: at least one protective layer provided between the separation membrane and the feed-side channel component; and at least one reinforcement porous membrane provided as a layer on a permeate side of the separation membrane.

<16> The sealing method according to <14> or <15>, further including the step of applying an adhesive such that the adhesive penetrates into both widthwise-end continuous areas of an element constituent layer, the widthwise-end continuous areas each extending from a corresponding widthwise end of the element constituent layer and reaching a corresponding one of imaginary lines obtained by extending in a thickness direction widthwise ends of the separation membrane, the element constituent layer including at least one selected from the group consisting of the permeate-side channel component, at least one protective layer provided between the separation membrane and the feed-side channel component, and at least one reinforcement porous membrane provided as a layer on a permeate side of the separation membrane.

<17> The sealing method according to any one of <14> to <16>, further including the step of applying an adhesive to both widthwise ends of the support layer.

<18> The sealing method according to any one of <14> to <17>, further including the step of treating, with a hydrophilic treatment agent, widthwise ends of at least one of the protective layer and the support layer, in advance of application of an adhesive.

<19> The sealing method according to <18>, wherein the hydrophilic treatment agent is a surface active agent.

Advantageous Effects of Invention

The present invention makes it possible, for example, to form a sealing section regardless of types of a member, types of an adhesive, and combinations of the member and the adhesive. The present invention also makes it possible to provide a spiral-wound acid gas separation membrane element, an acid gas separation membrane module, and an acid gas separation apparatus each of which achieves higher gas tightness than conventional one. In addition, the spiral-wound acid gas separation membrane element, the acid gas separation membrane module, and the acid gas separation apparatus according to the present invention can not only separate acid gas from mixed gas including at least acid gas more efficiently than conventional one, but also save energy.

Figure 12:
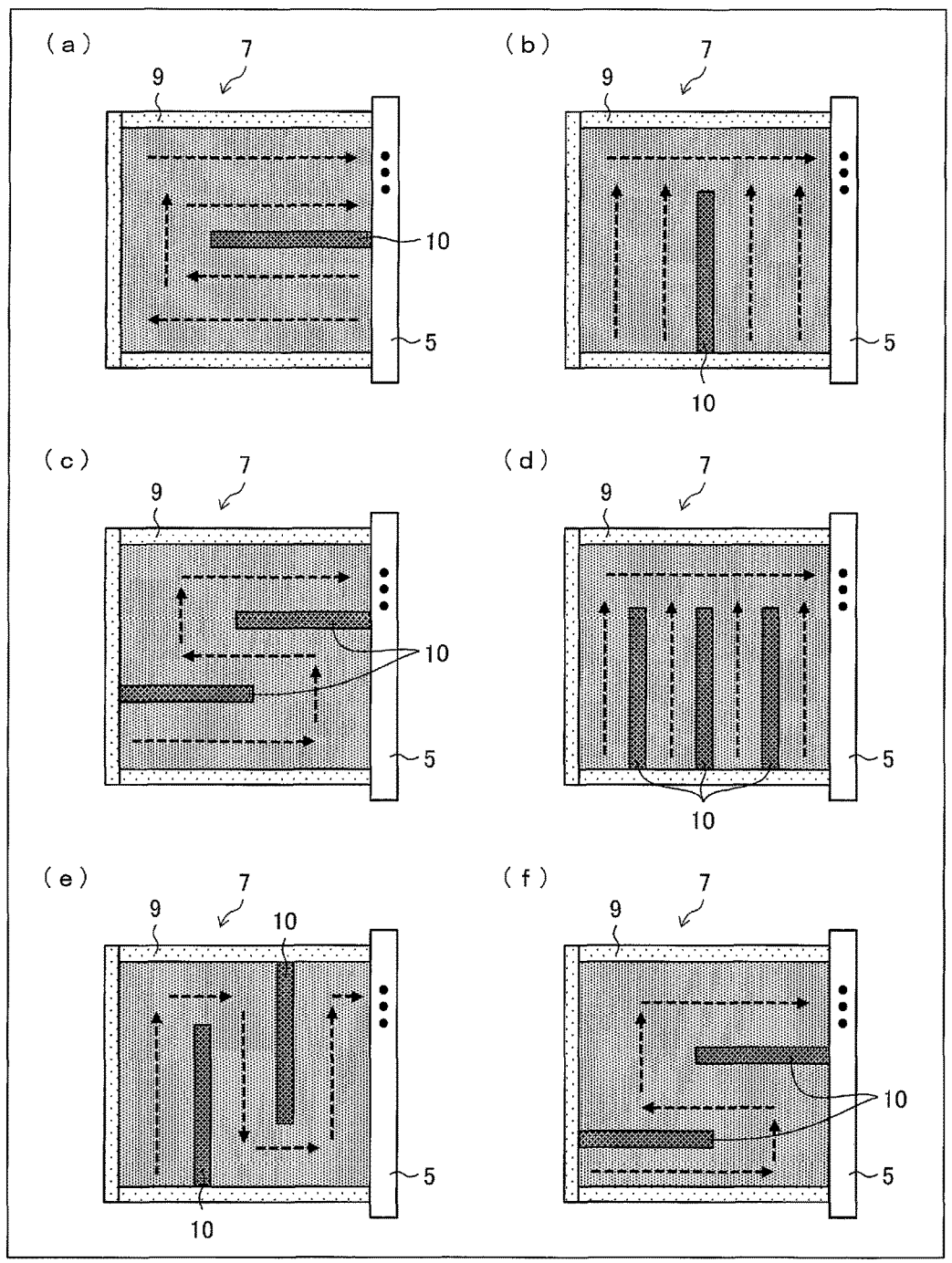

(a) to (f) of FIG. 12 are each a plan view schematically illustrating a shape of a partition(s) that may be provided in a permeate-side spatial portion defined by a separation membrane and a permeate-side channel component, both included in the wound body.

Figure 13:
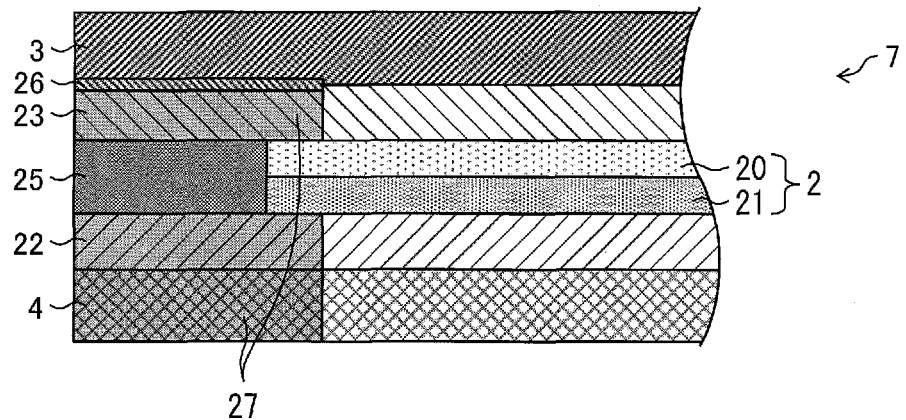

FIG. 13 is a cross-sectional view schematically illustrating a sealing structure of a spiral-wound acid gas separation membrane element according to Example 4.

Figure 14:
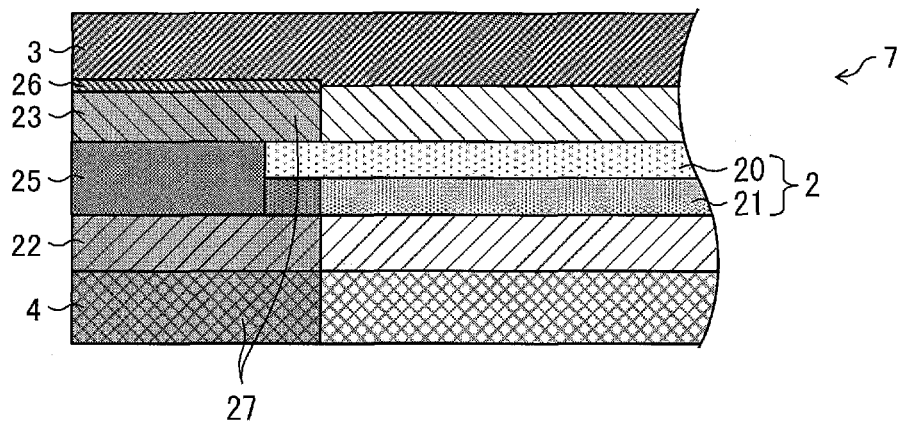

FIG. 14 is a cross-sectional view schematically illustrating a sealing structure of a spiral-wound acid gas separation membrane element according to Example 5.

Figure 15:
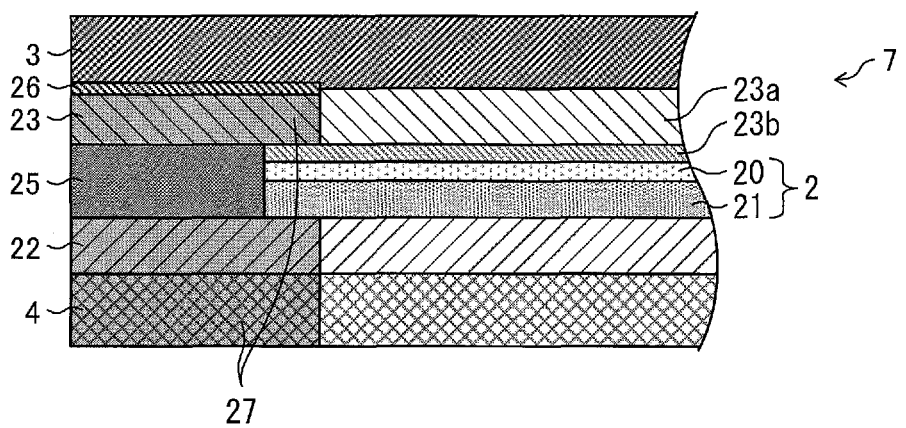

FIG. 15 is a cross-sectional view schematically illustrating a sealing structure of a spiral-wound acid gas separation membrane element according to Example 6.

Figure 16:
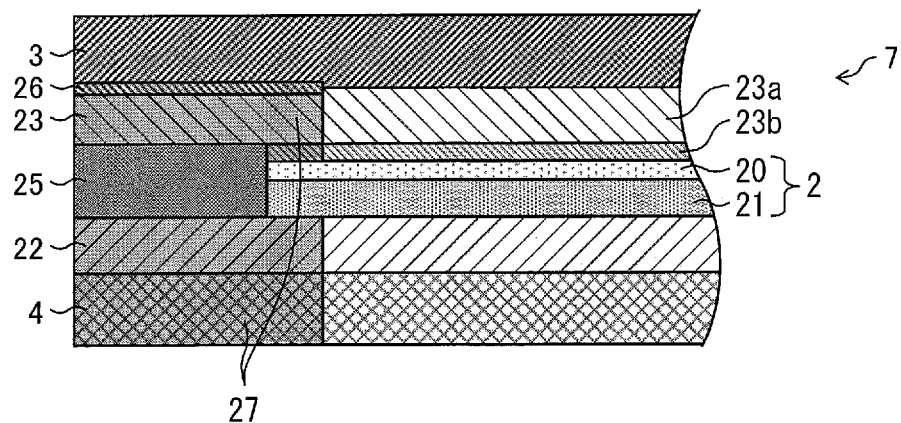

FIG. 16 is a cross-sectional view schematically illustrating a sealing structure of a spiral-wound acid gas separation membrane element according to Example 7.

Figure 17:
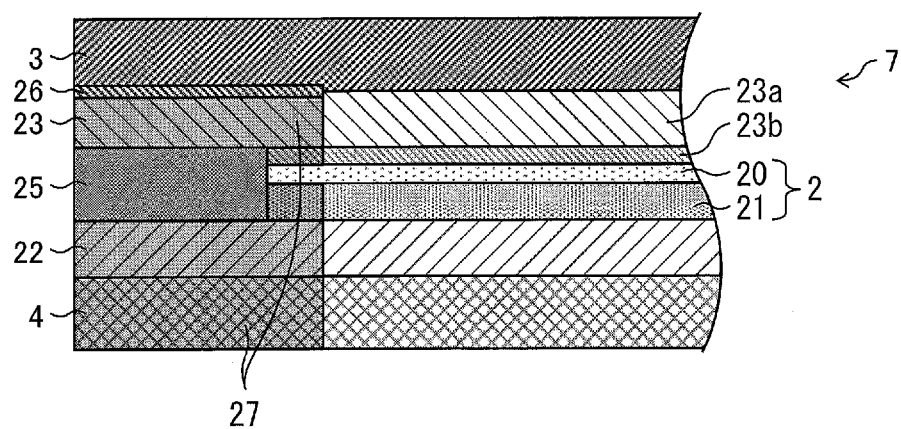

FIG. 17 is a cross-sectional view schematically illustrating a sealing structure of a spiral-wound acid gas separation membrane element according to Example 8.

DESCRIPTION OF EMBODIMENTS

An embodiment of the present invention is described below in detail. For the present application, the expression "A to B" means not less than A and not more than B.

<Spiral-Wound Acid Gas Separation Membrane Element>

A spiral-wound acid gas separation membrane element according to the present invention is configured to include: a wound body including: a separation membrane; a feed-side channel component; a permeate-side channel component; a sealing section; and a perforated core tube, the separation membrane, the feed-side channel component, and the permeate-side channel component being in a laminated state and wound around the perforated core tube, the separation membrane including: a separate functional layer including: an acid gas carrier that reversibly reacts with acid gas; and an acid gas separation membrane resin; and a support layer including a porous membrane, the permeate-side channel component being greater at least in an across-the-width direction of the permeate-side channel component than the separation membrane, and the sealing section being provided at each of both widthwise ends of the separation membrane, for filling in a gap formed between the permeate-side channel component and the separation membrane.

The spiral-wound acid gas separation membrane element may further include at least one selected from the group consisting of: at least one protective layer provided between the separation membrane and the feed-side channel component; and at least one reinforcement porous membrane provided as a layer on a permeate side of the separation membrane; and a permeate-side channel component.

The element constituent layer includes at least one selected from the group consisting of a protective layer provided between the separation membrane and the feed-side channel component, a reinforcement support layer provided on a permeate side of the separation membrane, and a permeate-side channel component. The element constituent layer preferably includes the permeate-side channel component.

For the present application, the term "acid gas" refers to a gas having acidity such as carbon dioxide and hydrogen sulfide. In the detailed description below, the acid gas is carbon dioxide ($CO_2$) as an example.

Figure 1:
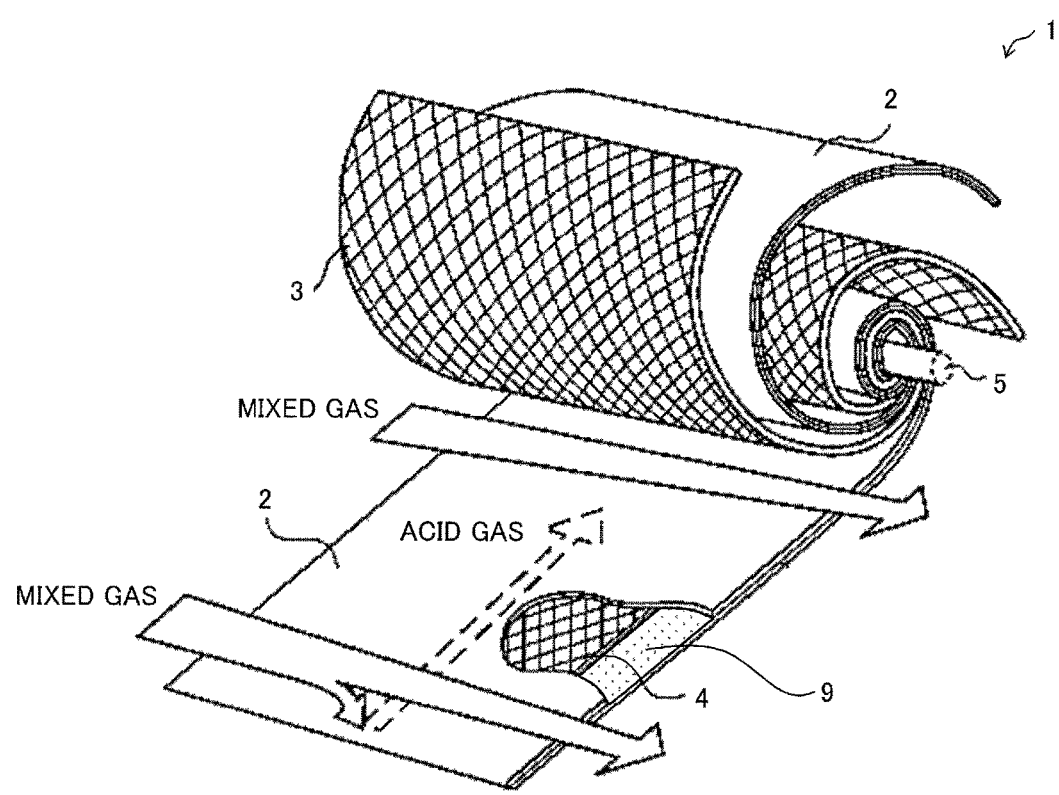
FIG. 1 is a perspective view of an acid gas separation membrane module according to the present invention, the view schematically illustrating a structure of a wound body included in the acid gas separation membrane module as developed and having a partial cutout portion (Academic Papers: Ind. Eng. Chem. Res. 2002, 41, 1393-1411, partially modified FIG. 3).
Figure 2:
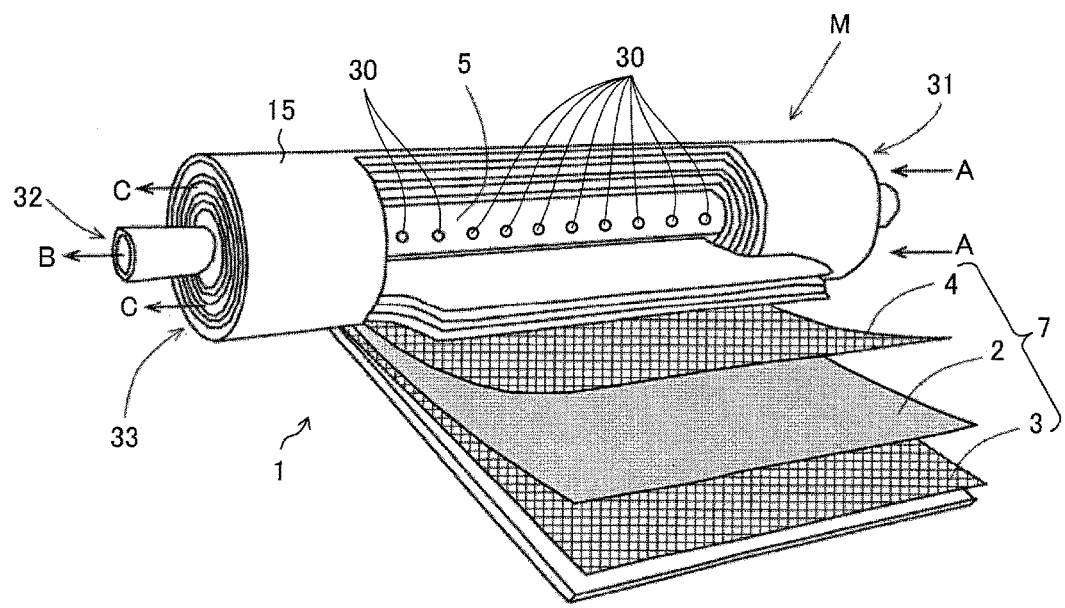
FIG. 2 is a perspective view of the acid gas separation membrane module, the view schematically illustrating a structure thereof as having a partially developed portion.

The description below deals with a configuration of a spiral-wound acid gas separation membrane element with reference to FIGS. 1 and 2. As illustrated in FIGS. 1 and 2, a spiral-wound acid gas separation membrane element 1 according to the present invention preferably includes a wound body which includes a separation membrane 2, a feed-side channel component 3, a permeate-side channel component 4, and a perforated core tube 5, the separation membrane 2, the feed-side channel component 3, and the permeate-side channel component 4 being wound in a laminated state around the perforated core tube 5.

The wound body may be in the shape of a cylindrical tube or an angular tube. The wound body is, however, preferably in the shape of a cylindrical tube to be contained in a housing.

The spiral-wound acid gas separation membrane element 1 further includes a fixing member such as a reinforcement tape and anti-telescoping devices (ATDs) to fix the wound body in order to prevent the wound body from unwinding. A reinforcement tape is wound around the wound body along its outer periphery to prevent the wound body from unwinding. Anti-telescoping devices are attached to the opposite ends of the wound body to prevent telescoping from occurring to the wound body during use of the spiral-wound acid gas separation membrane element. The spiral-wound acid gas separation membrane element 1 includes another reinforcement member wound around the wound body along its outer periphery to ensure strength against loads of an internal pressure and an external pressure both applied to the spiral-wound acid gas separation membrane element. The reinforcement member, for example, includes a glass fiber impregnated with epoxy resin. The epoxy resin is preferably cured after the reinforcement member is wound around the wound body.

[Separation Membrane 2]

Figure 9:
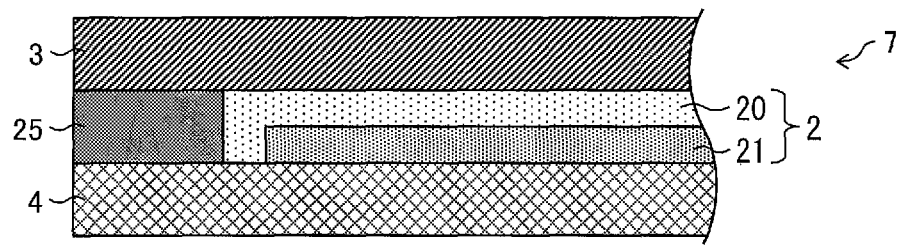
FIG. 9 is a cross-sectional view schematically illustrating a sealing structure of a spiral-wound acid gas separation membrane element.
Figure 10:
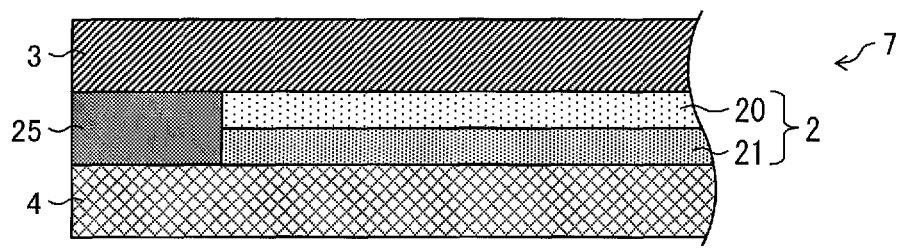
FIG. 10 is a cross-sectional view schematically illustrating another sealing structure of a spiral-wound acid gas separation membrane element.
Figure 11:
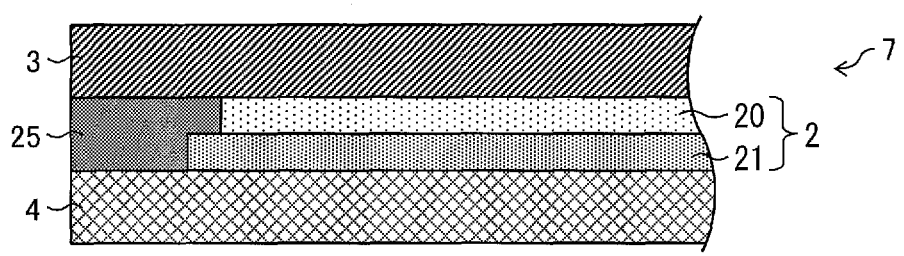
FIG. 11 is a cross-sectional view schematically illustrating still another sealing structure of a spiral-wound acid gas separation membrane element.

The separation membrane 2 includes at least (i) a separate functional layer 20 containing an acid gas carrier that reversibly reacts with acid gas and an acid gas separation membrane resin and (ii) a support layer 21 including a porous membrane to support the separate functional layer 20 (FIGS. 9 through 11).

The separation membrane 2 allows acid gas such as $CO_2$ and water vapor to permeate therethrough, but does not allow other gas to permeate therethrough easily. The separation membrane 2 has a solution-diffusion mechanism based on the difference between (i) the solubility of gas molecules in the membrane and (ii) the diffusivity of gas molecules in the membrane. The separation membrane 2 also has a facilitated transport mechanism for facilitating permeation of a particular acid gas by forming a reaction product of acid gas and an acid gas carrier that reversibly reacts with the acid gas. With use of these mechanisms, the separation membrane 2 highly selectively allows a particular acid gas to permeate therethrough. The separation membrane 2 allows acid gas to permeate therethrough in an amount that varies according to the humidity: It allows acid gas to permeate therethrough in an amount that is larger at higher humidity.

(Acid Gas Separation Membrane Resin)

The Reaction Formula (1) below represents a reaction between $CO_2$ and a $CO_2$ carrier, in which case the acid gas is carbon dioxide ($CO_2$) and the acid gas carrier ($CO_2$ carrier) is cesium carbonate ($Cs_2CO_3$). The sign "<->" in the Reaction Formula (1) means that this reaction is a reversible reaction.

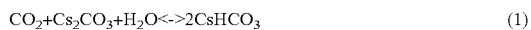

$$CO_2+Cs_2CO_3+H_2O<->2CsHCO_3 \quad (1)$$

As indicated in the Reaction Formula (1) above, the reversible reaction between $CO_2$ and the $CO_2$ carrier requires water. Thus, the separate functional layer 20 preferably includes, as an acid gas separation membrane resin, a hydrophilic resin containing a hydrophilic group such as a hydroxyl group or an ion exchange group, more preferably a cross-linked hydrophilic resin in which molecular chains of the hydrophilic resin are cross-linked to one another to provide a network structure for a high water-holding capacity. Further, a large differential pressure is applied as a driving force for acid gas to permeate through the separation membrane 2. Thus, the separate functional layer 20 preferably includes, as an acid gas separation membrane resin, a cross-linked hydrophilic resin to also ensure a pressure-withstanding strength required of the separation membrane 2.

The hydrophilic resin includes, for example, a polymer that preferably contains a structural unit derived from alkyl acrylate ester, alkyl methacrylate ester, vinyl ester of fatty acid, or a derivative of any of the above. Examples of such a hydrophilic polymer include a polymer produced by polymerizing a monomer such as acrylic acid, itaconic acid, crotonic acid, methacrylic acid, and vinyl acetate. Specific examples include (i) a polyacrylic acid, a polyitaconic acid, a polycrotonic acid, a polymethacrylic acid, and the like acid each of which contains a carboxyl group as an ion exchange group, (ii) a polyvinyl alcohol and the like alcohol each of which contains a hydroxyl group, and (iii) a copolymer of the above such as an acrylic acid-vinyl alcohol copolymer, an acrylic acid-methacrylic acid copolymer, an acrylic acid-methyl methacrylate copolymer, a methacrylic acid-methyl methacrylate copolymer and the like copolymer. More preferable among the above are (i) a polyacrylic acid, which is an acrylic acid polymer, (ii) a polymethacrylic acid, which is a methacrylic acid polymer, (iii) a polyvinyl alcohol, which is produced by hydrolyzing a vinyl acetate polymer, (iv) an acrylate-vinyl alcohol copolymer, which is produced by saponifying a copolymer of methyl acrylate and vinyl acetate, and (v) an acrylic acid-methacrylic acid copolymer, which is a copolymer of acrylic acid and methacrylic acid. Even more preferable among the above are a polyacrylic acid and an acrylate-vinyl alcohol copolymer.

The cross-linked hydrophilic resin may be prepared by reacting a hydrophilic polymer with a crosslinking agent or by copolymerizing a monomer as a raw material of a hydrophilic polymer with a crosslinkable monomer. The crosslinking agent and the crosslinkable monomer are not limited to any particular kinds, and can be conventionally publicly known cross-linking agent and cross-linkable monomer.

Examples of the cross-linking agent include conventionally publicly known cross-linking agents such as an epoxy cross-linking agent, a polyvalent glycidyl ether, a polyhydric alcohol, a polyvalent isocyanate, a polyvalent aziridine, a haloepoxy compound, a polyvalent aldehyde, a polyvalent amine, an organometallic cross-linking agent, and a metallic cross-linking agent. Examples of the cross-linkable monomer include conventionally publicly known cross-linkable monomers such as divinylbenzene, N,N'-methylenebisacrylamide, trimethylolpropane triallyl ether, and pentaerythritol tetraaryl ether. Example cross-linking methods include conventionally publicly known techniques such as thermal cross-linking, ultraviolet cross-linking, electron beam cross-linking, radiation cross-linking, and photocross-linking as well as methods disclosed in Japanese Patent Application Publication, Tokukai, No. 2003-268009 A and Japanese Patent Application Publication, Tokukaihei, No. 7-88171 A.

(Acid Gas Carrier)

The separate functional layer 20 includes (i) an acid gas separation membrane resin (for example, a hydrophilic resin) and (ii) in the case where the acid gas is, for example, $CO_2$, at least one compound (hereinafter referred to as "$CO_2$ carrier") selected from the alkali metal compound group consisting of alkali metal carbonate, alkali metal bicarbonate, and alkali metal hydroxide. The $CO_2$ carrier is present in the separate functional layer 20, which includes the acid gas separation membrane resin, and reversibly reacts with $CO_2$ dissolved in water present in the separate functional layer 20 to selectively allow the $CO_2$ to permeate through the separation membrane 2. The $CO_2$ carrier is preferably a carbonate, a bicarbonate, or a hydroxide of at least one alkali metal selected from the group consisting of Na, K, Rb, and Cs. Examples of the alkali metal carbonate include sodium carbonate, potassium carbonate, rubidium carbonate, and cesium carbonate; examples of the alkali metal bicarbonate include sodium bicarbonate, potassium bicarbonate, rubidium bicarbonate, and cesium bicarbonate; and examples of the alkali metal hydroxide include sodium hydroxide, potassium hydroxide, rubidium hydroxide, and cesium hydroxide. The $CO_2$ carrier is preferably an alkali metal carbonate or an alkali metal hydroxide each having deliquescence, more preferably cesium carbonate or cesium hydroxide, each of which is highly soluble in water.

The separate functional layer 20 contains, in addition to alkali metal cations derived from the $CO_2$ carrier, various alkali metal cations such as alkali metal cations used in a neutralization reaction of, for example, an ion exchange group (for example, a carboxyl group) in the hydrophilic resin. All of these alkali metal cations are contained in the separate functional layer 20 in an amount preferably within the range of 1 molar equivalent to 6 molar equivalents, more preferably within the range of 1.5 molar equivalents to 5 molar equivalents, with respect to the total amount of the ion exchange group in the hydrophilic resin. If the alkali metal cations are contained in an amount of less than 1 molar equivalent, the separate functional layer 20 may not be easily in the form of a membrane. If the alkali metal cations are contained in an amount of more than 6 molar equivalents, the separate functional layer 20 may not achieve desired CO$_2$ selective permeation.

(Additive)

The separate functional layer 20 of the separation membrane 2 is formed with use of a coating solution (described later) that, in addition to (i) an acid gas carrier that reversibly reacts with acid gas and (ii) an acid gas separation membrane resin both to be included in the separate functional layer 20, may further contain, for example, a hydration reaction catalyst for acid gas and/or a later-described surface active agent as an additive. The hydration reaction catalyst for acid gas increases the rate of reaction between the acid gas and the carrier.

The hydration reaction catalyst for acid gas preferably contains an oxo acid compound, particularly an oxo acid compound of at least one element selected from the group 14 elements, the group 15 elements, and the group 16 elements, more preferably contains at least one of a tellurous acid compound, a selenious acid compound, an arsenious acid compound, and an orthosilicic acid compound.

(Support Layer 21)

The separation membrane 2 includes the support layer 21 containing a porous film, on a side where the permeate-side channel component 4 is provided. The porous membrane has high gas permeability and does not serve as resistance against diffusion of a gas component after membrane permeation of the gas component. The separation membrane 2 is intended for use in a process of producing, for example, hydrogen and/or urea in a large-scale plant, in which process the separation membrane 2 is used at a temperature of not lower than 100° C. The members of the separation membrane 2 such as the porous membrane thus each preferably have a heat resistance of not lower than 100° C. For the present application, the expression "heat resistance of not lower than 100° C." refers to the following property of a member such as the porous membrane: Even after the member has been stored at a temperature of not lower than 100° C. for 2 hours, the form of the member before the storage is maintained, and there occurs no visually recognizable curl caused by thermal contraction or thermal melting.

The porous membrane included in the support layer 21 is made of a material such as (i) a polyolefin resin such as polyethylene and polypropylene, (ii) a fluorine-containing resin such as polytetrafluoroethylene (PTFE), polyvinyl fluoride, and polyvinylidene fluoride, (iii) a resin material such as polyphenylene sulfide (PPS), polyether sulfone, polyether ether ketone (PEEK), polyimide, high-molecular-weight polyester, heat-resistant polyamide, aramid, and polycarbonate, and (iv) an inorganic material such as metal, glass, and ceramics. Preferable among the above are a fluorine-containing resin such as PTFE, polyvinyl fluoride, and polyvinylidene fluoride, PPS, polyether sulfone, PEEK, polyimide, and ceramics for water repellency and heat resistance. More preferable among the above is PTFE for such reasons as follows: (i) PTFE allows minute pores to be easily formed. (ii) PTFE can have high porosity, and thus achieves high energy efficiency for separation.

The porous membrane may have any thickness. Typically, the thickness falls preferably within the range of 10 μm to 3000 μm, more preferably within the range of 10 μm to 500 μm, even more preferably within the range of 15 μm to 150 μm, for a greater mechanical strength. The pores of the porous membrane may have any average pore size. The average pore size is preferably not more than 10 μm, more preferably within the range of 0.005 μm to 1.0 μm. The porous membrane has a porosity preferably within the range of 5% to 99%, more preferably within the range of 30% to 90%.

The support layer 21 may have widthwise ends which have been subjected to hydrophilic treatment preceding application of an adhesive (described later). This hydrophilic treatment is intended to improve penetration of the adhesive into regions of the widthwise ends of the support layer. The hydrophilic treatment can be performed by treating the widthwise ends of the support layer with, for example, a surface active agent. The surface active agent is one similar to surface active agents which will be described below.

(Method for Producing Separation Membrane 2)

The description below deals with a method for producing the separation membrane 2. The production of the separation membrane 2 involves three steps: a first step (coating solution preparing step), a second step (applying step), and a third step (drying step). The second step and the third step each preferably use roll-to-roll coater and dryer, which carry out the second step and the third step while continuously transferring the support layer 21. The three steps are described below in detail.

First, in the first step (coating solution preparing step), at least an acid gas separation membrane resin and a CO$_2$ carrier are dissolved in a medium to prepare a coating solution.

Examples of the medium include (i) a protic polar medium such as water, and an alcohol such as methanol, ethanol, 1-propanol, and 2-propanol, (ii) a nonpolar medium such as toluene, xylene, and hexane, and (iii) an aprotic polar medium such as a ketone such as acetone, methyl ethyl ketone, and methyl isobutyl ketone, N-methylpyrrolidone, N,N-dimethylacetamide, and N,N-dimethylformamide. The first step may use a single kind of medium alone, or two or more kinds in combination that are mixed uniformly. Preferable among the above is a medium containing at least one selected from the group consisting of water and an alcohol such as methanol, ethanol, 1-propanol, and 2-propanol. More preferable among the above is a medium containing water.

The coating solution may contain a surface active agent as necessary. Adding a surface active agent to the coating solution achieves the following advantage: In a case where the coating solution is applied to the support layer 21 including the porous membrane, the surface active agent is unevenly present at the interface between a separate functional layer 20 formed of the coating solution and the support layer 21 to (i) increase affinity for the support layer 21 and (ii) alleviate problems such as uneven thickness of the membrane. The surface active agent is not limited to any particular kind. Examples of the surface active agent include conventionally publicly known surface active agents such as a polyoxyethylene polyoxypropylene glycol, a polyoxyethylene alkyl phenyl ether, a polyoxyethylene alkyl ether, a fluorine-based surface active agent, and a silicone-based surface active agent. The coating solution may contain a single kind of surface active agent alone, or two or more kinds in combination.

Next, in the second step (applying step), the coating solution prepared is applied to a surface of the support layer 21 to form a coating. During the second step, the coating solution may have a temperature set as appropriate depending on the composition and/or concentration of the coating solution. An excessively high temperature may, however, cause the medium to evaporate from the coating solution in a large amount, possibly changing the composition and/or concentration and/or leaving a mark of evaporation in the coating. The temperature is thus preferably not lower than 15° C., more preferably not lower than room temperature (20° C.), and preferably falls within the temperature range of not higher than 5° C. lower than the boiling point of the medium in use. In a case where the medium is water, for example, the coating solution during the second step has a temperature preferably within the temperature range of 15° C. to 95° C.

The coating solution may be applied to the support layer 21 by any method. Examples of the method include spin coating, bar coating, die coating, blade coating, air-knife coating, gravure coating, roll coating, spray coating, dip coating, Comma roll method, kiss coater method, screen printing, and inkjet printing. The coating solution is applied in a weight per unit area (solid content per unit area) preferably within the range of 1 g/m$^2$ to 1000 g/m$^2$, more preferably within the range of 5 g/m$^2$ to 750 g/m$^2$, even more preferably within the range of 10 g/m$^2$ to 500 g/m$^2$. The weight per unit area can be adjusted (controlled) on the basis of, for example, the speed of forming the coating (for example, the speed of transferring the support layer 21), the concentration of the coating solution, and/or the discharge amount of the coating solution. The coating solution may be applied to the support layer 21 in a stripe pattern or a dot pattern.

Then, in the third step (drying step), the medium is removed from the coating formed. The medium may be removed by any method, and can be removed by a conventionally publicly known method. The medium is, however, preferably removed by a method of drying the coating by subjecting the coating to, for example, flowing heated air to the coating to cause the medium to evaporate for removal. A specific example is a method of causing the medium to evaporate from the coating for removal by putting the applied product (that is, the support layer 21 on which a coating has been formed) into an air blowing drying furnace adjusted to have a predetermined temperature and a predetermined humidity. This forms a separate functional layer 20.

The coating may be dried at a temperature set as appropriate depending on (i) the medium for the coating solution and (ii) the kind of porous membrane included in the support layer 21. Typically, the drying temperature is preferably higher than the freezing point of the medium and lower than the melting point of the porous membrane. Normally, a suitable drying temperature falls within the range of 80° C. to 200° C.

The third step is performed until the concentration of the medium in the coating decreases below a predetermined value. Specifically, the third step is preferably performed until the amount of the medium in the separate functional layer 20 decreases within the range of 1 weight % to 34 weight %.

The separate functional layer 20 has a thickness selected as appropriate depending on the separation capability necessary for the separation membrane 2. Typically, however, the thickness falls preferably within the range of 0.1 μm to 600 μm, more preferably within the range of 0.5 μm to 400 μm, particularly preferably within the range of 1 μm to 200 μm.

Alternatively, the second step and the third step may be repeated at least once on an exposed surface of the formed separate functional layer 20 to form a laminate of separate functional layers 20. This can prevent formation of a pinhole in the separate functional layer 20 which pinhole may be caused by, for example, unevenness of the coating formed by the application of the coating solution. In the case where the second step and the third step are repeated, the individual separate functional layers 20 may be formed either under different coating conditions (such as the composition of the coating solution and the amount of the coating solution applied) and drying conditions or under identical coating conditions and drying conditions.

Performing the first step, the second step, and the third step described above produces a separation membrane 2 to be included in the spiral-wound acid gas separation membrane element 1.

[Feed-Side Channel Component 3]

The feed-side channel component 3 preferably has (i) a function as a channel component that defines a channel space for mixed gas (hereinafter referred to also as "feed-side spatial portion") and (ii) a function of generating a turbulent flow in mixed gas. The feed-side channel component 3 is thus suitably a net-shaped channel component. Different mesh shapes define different channels for mixed gas. The feed-side channel component 3 may thus have a mesh with a unit lattice in a shape (for example, a rhombus or a parallelogram) selected in correspondence with the desired channel space for mixed gas. The feed-side channel component 3 may be made of any material. However, since the separation membrane 2 is used at a temperature of not lower than 100° C., the material is preferably heat-resistant, and can suitably be, for example, a material similar to any material cited as an example material for the porous membrane. Specifically, the material is preferably PTFE, PPS, polyether sulfone, PEEK, polyimide, or metal, more preferably PTFE, PPS, PEEK, or metal.

The feed-side channel component 3 defines a channel space for guiding mixed gas into the wound body. Mixed gas is thus fed into the wound body continuously in a direction toward a side surface of the feed-side channel component 3.

The feed-side channel component 3 may be separated from the separation membrane 2 in the wound body by a porous membrane for protection as a protective layer. The protective layer serves to prevent the separate functional layer 20 of the separation membrane 2 from being damaged due to a misalignment between the separate functional layer 20 and the feed-side channel component 3 when the wound body is compressed during the production of the spiral-wound acid gas separation membrane element 1. The porous membrane for protection may be made of any material that causes only small friction with the feed-side channel component 3 and that has good gas permeability. However, since the separation membrane 2 is used at a temperature of not lower than 100° C., the material is preferably heat-resistant, and can suitably be, for example, a material similar to any material cited as an example material for the porous membrane included in the support layer 21 of the separation membrane 2. Meanwhile, the porous membrane for protection may be selected for use as appropriate from among nonwoven fabric, woven fabric, net, and the like each having an average pore size of not less than 0.001 μm and not more than 10 μm. The protective layer may be structured from a laminate of porous membranes of one or more kinds.

Note that the protective layer (porous membrane for protection) may have widthwise ends which have been subjected to hydrophilic treatment preceding application of an adhesive (described later). This hydrophilic treatment is intended to improve penetration of the adhesive (described later) into regions of the widthwise ends of the protective layer. The hydrophilic treatment can be performed by treating the widthwise ends of the protective layer with, for example, a surface active agent. The surface active agent is one similar to the surface active agents described above.

[Permeate-Side Channel Component 4]

The permeate-side channel component 4 preferably has (i) a function as a channel component that defines a channel space for permeation gas (containing acid gas and water vapor) (hereinafter referred to also as "permeate-side spatial portion") having permeated through the separation membrane 2 and (ii) a function of generating a turbulent flow in the acid gas. The permeate-side channel component 4 is thus suitably a net-shaped channel component. Different mesh shapes define different channels for permeation gas. The permeate-side channel component 4 may thus have a mesh with a unit lattice in a shape (for example, a rhombus or a parallelogram) selected in correspondence with the desired channel space for mixed gas. The permeate-side channel component 4 may be made of any material. However, since the separation membrane 2 is used at a temperature of not lower than 100° C., the material is preferably heat-resistant, and can suitably be, for example, a material similar to any material cited as an example material for the porous membrane. Specifically, the material is preferably PTFE, PPS, polyether sulfone, PEEK, polyimide, or metal, more preferably PTFE, PPS, PEEK, or metal.

The permeate-side channel component 4 defines a permeate-side spatial portion for guiding permeation gas, which has permeated through the separation membrane 2, into the core tube 5.

The feed-side channel component 3 and the permeate-side channel component 4 each preferably have (i) a function of facilitating a turbulent flow (front surface renewal of a membrane surface) of mixed gas fed or permeation gas, which has permeated through the separation membrane 2, to increase the speed of membrane permeation of acid gas included in the mixed gas and (ii) a function of minimizing a pressure drop in the mixed gas fed.

The wound body may further include a reinforcement porous membrane 22 between the separation membrane 2 and the permeate-side channel component 4. This reinforcement porous membrane 22 is preferably placed on a surface of the support layer of the separation membrane 2. This reinforcement porous membrane 22 has a function of imparting, to the separation membrane 2, the strength for allowing the separation membrane 2 to withstand, for example, tensile load applied on the support layer 21 during the production of the separation membrane 2, tensile load applied on the separation membrane 2 during the production of the spiral-wound acid gas separation membrane element including the separation membrane 2, and pressure load applied on the separation membrane 2 during separation of acid gas from mixed gas. Note that this reinforcement porous membrane 22 has a structure and a material which have pressure-withstanding strength and resistance against extension, and is not limited to any particular kind as long as the structure and the material has good gas permeability. For example, the structure and the material of the reinforcement porous membrane 22 may be selected as appropriate from among nonwoven fabric, woven fabric, net, and the like each having an average pore size of not less than 0.001 µm and not more than 10 µm. Preferable among the above is a material having heat resistance, like the separate functional layer 20 and the support layer 21 each of which is made of an acid gas separation membrane resin composition.

[Sealing Structure]

In the spiral-wound acid gas separation membrane element of the present invention, the permeate-side channel component 4 is greater at least in a width direction (direction parallel to the core tube 5) of the permeate-side channel component 4 than the separation membrane 2. Further, the spiral-wound acid gas separation membrane element according to the present invention includes a sealing section 25 at both widthwise ends of the separation membrane 2 for filling in a gap formed at the time when the permeate-side channel component 4 and the separation membrane 2 are provided so as to form a laminate.

The spiral-wound acid gas separation membrane element is not particularly limited in structure and may have structures which can be broadly sorted in the following three types: (A) a structure in which the separate functional layer 20 covers side surfaces (cross sections along a thickness direction) of the support layer 21, at both widthwise ends of the support layer 21; (B) a structure in which the separate functional layer 20 and the support layer 21 have the same width in the width direction, and the separate functional layer 20 and the support layer 21 are provided on top of each other so as to form a laminate in which widthwise ends of the separate functional layer 20 are aligned with widthwise ends of the support layer 21, respectively; and (C) the separate functional layer 20 has a smaller width than the support layer 21 in the width direction and the separate functional layer 20 is provided on an inner side of the support layer 21 in a laminate. Herein, the term "widthwise terminal end" means a part positioned on a line connecting, in a thickness direction, a widthwise end of the feed-side channel component 3 and a widthwise end of the permeate-side channel component 4 in an arrangement in which each layer is extended in the width direction.

Figure 5:
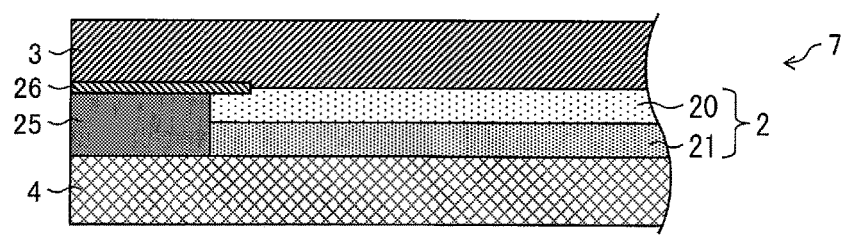
FIG. 5 is a cross-sectional view schematically illustrating a sealing structure of a spiral-wound acid gas separation membrane element according to Example 1.
Figure 6:
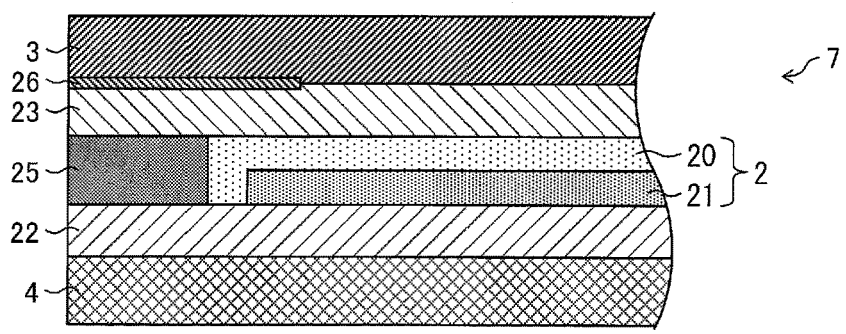
FIG. 6 is a cross-sectional view schematically illustrating a sealing structure of a spiral-wound acid gas separation membrane element according to Example 2.
Figure 7:
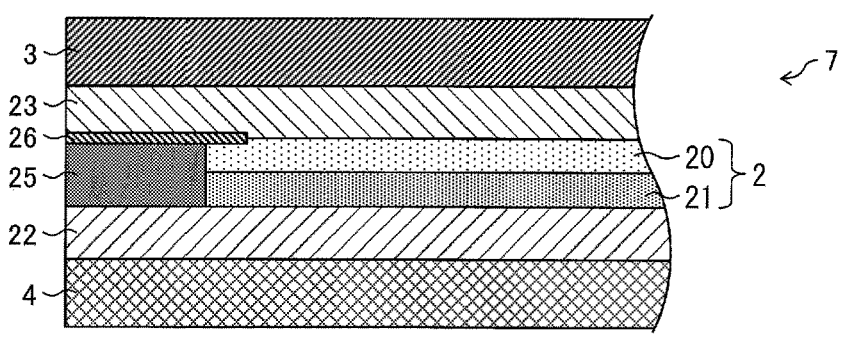
FIG. 7 is a cross-sectional view schematically illustrating a sealing structure of a spiral-wound acid gas separation membrane element according to Example 3.

The following describes respective structures of the above (A) to (C) with reference to FIGS. 5 through 7, and 9 through 11. FIGS. 6 and 7 each illustrate, as an example, a case where the spiral-wound acid gas separation membrane element includes a protective layer 23 as a protective layer and the reinforcement porous membrane 22. However, if the support layer 21 has a sufficient strength, the reinforcement porous membrane 22 may be omitted. Meanwhile, if no damage is given to the separate functional layer 20 during production of the membrane element, the protective layer 23 may be omitted.

FIGS. 6 and 9 each illustrate one example of the structure of the above (A).

FIG. 9 illustrates a structure in which (i) the permeate-side channel component 4 is greater at least in the width direction of the permeate-side channel component 4 than the separation membrane 2 and (ii) the separate functional layer 20 covers side surfaces (cross sections along a thickness direction) of the support layer 21 at both widthwise ends of the support layer 21.

FIG. 6 illustrates a modification of an aspect of sealing structure illustrated in FIG. 9. This aspect of sealing structure shows a structure in which: the separation membrane element illustrated in FIG. 9 additionally includes, as constituent layers, the protective layer 23 between the feed-side channel component 3 and the separation membrane 2, and the reinforcement porous membrane 22 between the separation membrane 2 and the permeate-side channel component 4; and the protective layer 23 and the reinforcement porous membrane 22 each have such a width that the protective layer 23 and the reinforcement porous membrane 22 each reach the both widthwise terminal ends. In other words, the protective layer 23 and the reinforcement porous membrane 22 each have substantially the same width as the feed-side channel component 3 and the permeate-side channel component 4. FIG. 6 illustrates a case where a penetration prevention tape 26 described below is used.

FIGS. 5, 7, and 10 each illustrate one example of the structure of the above (B).

FIG. 10 illustrates a structure in which (i) the permeate-side channel component 4 is greater at least in the width direction of the permeate-side channel component 4 than the separation membrane 2 and (ii) the separate functional layer 20 and the support layer 21 have the same width in the width direction.

FIG. 7 illustrates a modification of an aspect of sealing structure illustrated in FIG. 10. This aspect of sealing structure shows a structure in which: the separation membrane element illustrated in FIG. 10 additionally includes, as constituent layers, the protective layer 23 between the feed-side channel component 3 and the separation membrane 2, and the reinforcement porous membrane 22 between the separation membrane 2 and the permeate-side channel component 4; and the reinforcement porous membrane 22 and the protective layer 23 which covers an entire surface of the separate functional layer 20 each have such a width that the reinforcement porous membrane 22 and the protective layer 23 each reach the both widthwise terminal ends. In other words, the protective layer 23 and the reinforcement porous membrane 22 each have substantially the same width as the feed-side channel component 3 and the permeate-side channel component 4. FIG. 7 illustrates a case where a penetration prevention tape 26 described below is used.

FIG. 5 illustrates a case where the penetration prevention tape 26 described below is used in the aspect of sealing structure illustrated in FIG. 10.

FIG. 11 illustrates one example of the structure of the above (C).

FIG. 11 illustrates a structure in which (i) the permeate-side channel component 4 is greater at least in the width direction of the permeate-side channel component 4 than the separation membrane 2 and (ii) the separate functional layer 20 has a smaller width than the support layer 21 in the width direction.

The structure of the above (A) is more preferably used than the other structures among the above structures (A) to (C), for ensuring high gas tightness.

In the present invention, a seal is provided by filing in a gap with an adhesive between the permeate-side channel component 4 and the separation membrane 2 in the sealing section 25. The adhesive may be applied, for example, by pushing the adhesive into the sealing section 25 from a widthwise terminal end toward a widthwise end of the separation membrane 2 in a stage after lamination of constituent layers of the separation membrane element. Alternatively, the adhesive may be applied by mounting the adhesive such that the adhesive comes in contact with the widthwise end of the separation membrane 2, in a stage of lamination of constituent layers of the separation membrane element. Preferably, the adhesive is applied by mounting the adhesive such that the adhesive comes in contact with the widthwise end of the separation membrane 2, in a stage of lamination of constituent layers of the separation membrane element.

When the adhesive is pushed into the sealing section 25 or mounted, the adhesive preferably has a viscosity within the range of 5,000 cP to 50,000 cP, more preferably within the range of 20,000 cP to 50,000 cP, for prevention of incomplete formation of the sealing section 25 due to spreading of the adhesive.

The adhesive is not particularly limited and may be made of any material that can fill in the sealing section 25 provided so as to be in contact with the both widthwise ends of the separate functional layer 20 and form a bond. However, since the separation membrane 2 is used at a temperature of not lower than 100° C., the material is preferably both heat-resistant and moisture-resistant. Examples of such an adhesive include, for example, epoxy resin, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, polyamide resin, polyvinyl butyral, polyester, a cellulose derivative (nitrocellulose etc.), a styrene-butadiene copolymer, various synthetic rubber resins, phenol resin, urea resin, melamine resin, phenoxy resin, silicone resin, and urea formamide resin. Preferable among the above are epoxy resin (epoxy adhesive resin) and silicone resin. More preferable among the above is epoxy resin. The adhesive may further contain an inorganic or organic filler so as to adjust a viscosity during use of the adhesive and improve strength after curing. The epoxy resin only needs to be a compound which contains an epoxy group that is cured with an amine or an acid anhydride, and may be of a one-liquid-curing type or a two-liquid-mixture type in terms of a curing method. Further, the epoxy resin may be of a heat curing type or a normal temperature curing type, in terms of curing temperatures.

In addition to the above seal, the adhesive is desirably caused to penetrate into the permeate-side channel component 4 so that gas tightness is improved. In a case where the separation membrane element includes the reinforcement porous membrane 22 as a constituent layer, the adhesive is desirably caused to penetrate also into the reinforcement porous membrane 22. Meanwhile, in a case where the separation membrane element includes the protective layer 23 as a constituent layer, the adhesive is desirably caused to penetrate also into the protective layer 23. In these cases, the adhesive may be caused to penetrate into the permeate-side channel component 4, the reinforcement porous membrane 22, or the protective layer 23 from the widthwise terminal ends of the permeate-side channel component 4, in a stage after lamination of constituent layers of the separation membrane element. Alternatively, the adhesive may be caused to penetrate into the permeate-side channel component 4, the reinforcement porous membrane 22, or the protective layer 23 from surfaces of the permeate-side channel component 4, the reinforcement porous membrane 22, or the protective layer 23, in a stage of lamination of constituent layers of the separation membrane element. In other words, it is preferable that the spiral-wound acid gas separation membrane element according to the present invention include an adhesive penetration section 27 which is a sealing section into which an adhesive has been cause to penetrate. The adhesive penetration section 27 is provided in both widthwise-end continuous areas of the constituent layer of the separation membrane element, which widthwise-end continuous areas each extend from a corresponding widthwise end of the element constituent layer and reaching a corresponding one of imaginary lines obtained by extending in a thickness direction the widthwise ends of the separation membrane (see FIGS. 13 through 17). In such a case, the widthwise ends of the element component layer are preferably subjected in advance to the above-described hydrophilic treatment, for improving penetration of the adhesive into regions of the widthwise-end areas of the element constituent layer (e.g., protective layer).

The adhesive is not particularly limited in aspect of penetration, and may be caused to penetrate in a range in which gas on a feed side of the separation membrane element is prevented from being directly mixed with gas on a permeate side of the separation membrane element due to flow of gas in the permeate-side channel component 4, the reinforcement porous membrane 22, or the protective layer 23. In one possible aspect of penetration of the adhesive, for example, the adhesive is caused to penetrate into an area from the widthwise terminal ends of the permeate-side channel component 4, the reinforcement porous membrane 22, and the protective layer 23 to beyond the both widthwise ends of the separate functional layer 20. In other words, one possible aspect of the spiral-wound acid gas separation membrane element according to the present invention is arranged to include a sealing section in which the adhesive has been caused to penetrate into inner areas in the width direction of the constituent layer beyond the imaginary lines obtained by extending in a thickness direction the widthwise ends of the separation membrane.

Further, the spiral-wound acid gas separation membrane element according to the present invention may include, in each widthwise-end area of the support layer 21, a sealing section into which the adhesive has been caused to penetrate. In this case, the widthwise end of the support layer 21, that is, the sealing section into which the adhesive is caused to penetrate into the support layer 21 preferably has been subjected, in advance of application of the adhesive, to the above-described hydrophilic treatment, for the purpose of improving penetration of the adhesive into regions of the widthwise end of the support layer 21.

In order to prevent the adhesive applied to the sealing section 25 from entering the feed-side channel component 3 and thereby blocking entrance/exit of gas into/from the spatial portion defined by the feed-side channel component 3, it is possible to sandwich a penetration prevention tape 26 between the separate functional layer 20 and the feed-side channel component 3. For example, FIG. 5 illustrates a case where the penetration prevention tape 26 is used between the feed-side channel component 3 and the sealing section 25; FIG. 6 illustrates a case where the penetration prevention tape 26 is used between the feed-side channel component 3 and the protective layer 23; and FIG. 7 illustrates a case where the penetration prevention tape 26 is used between the protective layer 23 and the sealing section 25.

The penetration prevention tape 26 is not particularly limited. The penetration prevention tape 26 is made of preferably a material that is heat resistant, more preferably a material having a heat resistance of not lower than 100° C. In order to ensure the function of the penetration prevention tape 26, the penetration prevention tape 26 is desirably made of a material into which the adhesive does not penetrates. Examples of such a material of the penetration prevention tape 26 include polyimide, PTFE, glass fiber, and polyester, but not limited to these materials. Examples of a commercially available penetration prevention tape 26 includes SINGLE COATED TAPES•SC-6000 and SINGLE COATED TAPES•SC-6001 (both manufactured by Custom Adhesive Products, LLC). Note that the penetration prevention tape 26 may be removed or remain at the time when the spiral-wound acid gas separation membrane element is used.

The above-described sealing technique according to the present invention can be generally used for sealing of the spiral-wound acid gas separation membrane element, regardless of the material of the support layer 21. By use of a conventional sealing method in which an adhesive layer was caused to penetrate into a support layer, it was not possible to provide an appropriate seal in a case where the adhesive did not penetrate into the support layer due to a material of the support layer 21. In this case, it was necessary to replace the adhesive by an adhesive which penetrates into the support layer 21 or replace the material of the support layer 21 by a material into which the adhesive penetrates.

However, in the present invention, it is possible to provide a seal by filling the sealing section 25 with an adhesive. Accordingly, it is not necessary to consider compatibility of the adhesive with the support layer 21. This makes it possible to easily perform sealing. Further, in the present invention, a limit to specific combinations of the adhesive and the support layer 21 is eliminated. This makes it possible to use the most suitable adhesive and support layer in the spiral-wound acid gas separation membrane element. For example, in a case where a hydrophobic adhesive is used, the support layer 21 and the like may be either hydrophilic or hydrophobic. Even in a case where a hydrophilic adhesive is used, the support layer 21 still may be either hydrophilic or hydrophobic. In the present application, the term "hydrophobic" means that a contact angle of water at 25° C. is not less than 90'.

(Separation Membrane Laminate)

The wound body is configured such that mixed gas fed is not mixed with permeation gas, which has permeated through the separation membrane 2 and which contains acid gas. Specifically, the wound body includes a membrane leaf (separation membrane laminate) structured such that a long rectangular separation membrane 2 is folded into two parts with the separate functional layer 20 inside and with a long rectangular feed-side channel component 3 sandwiched between the two parts. The membrane leaf has a size of, for example, approximately 0.5 m to 1.5 m×0.5 m to 1.5 m. The membrane leaf is, in other words, structured such that a feed-side channel component 3 is sandwiched by a single separation membrane 2. The membrane leaf may be formed with, instead of a single separation membrane 2 folded into two parts, two long rectangular separation membranes 2 with their respective separate functional layers 20 inside and with a long rectangular feed-side channel component 3 sandwiched between the two separation membranes 2. In this case, an end of one of the two separation membranes 2 is bonded to an end of the other separation membrane 2 so that the two separation membranes 2 appear as if to be a single separation membrane 2.

The membrane leaf is bonded to the permeate-side channel component 4 with use of an adhesive to provide a laminate 7. The separation membrane 2 thus separates the permeate-side spatial portion, defined by the permeate-side channel component 4, from the feed-side spatial portion, defined by the feed-side channel component 3.

The adhesive may be made of any material that allows the membrane leaf, specifically the separation membrane 2, to be bonded to the permeate-side channel component 4. However, since the separation membrane 2 is used at a temperature of not lower than 100° C., the material is preferably both heat-resistant and moisture-resistant. Examples of the adhesive include an epoxy resin, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, a polyvinyl butyral, a polyester, a cellulose derivative (for example, nitrocellulose), a styrene-butadiene copolymer, various synthetic rubber resins, a phenol resin, a urea resin, a melamine resin, a phenoxy resin, a silicone resin, and a urea formamide resin. Preferable among the above are an epoxy resin (epoxy adhesive resin) and a silicone resin. More preferable among the above is an epoxy resin. When applied to, for example, the separation membrane 2, the adhesive has a viscosity preferably within the range of 5,000 cP to 50,000 cP, more preferably within the range of 20,000 cP to 50,000 cP, to prevent the adhesive from spreading for a larger adhesion section 9 and a smaller effective area for the separation membrane 2. The separation membrane 2 and the permeate-side channel component 4 are bonded to each other not necessarily with use of an adhesive.

FIGS. 12(a) to 12(f) are each a plan view schematically illustrating a shape of a partition(s) that may be provided in a permeate-side spatial portion defined by the separation membrane 2 and the permeate-side channel component 4, both included in the wound body. As illustrated in FIG. 12, the laminate 7 may as necessary contain, in the permeate-side spatial portion, at least one belt-like partition 10 for guiding a flow of permeation gas (indicated by broken lines in FIG. 12). Specifically, the laminate 7 may contain, in the permeate-side spatial portion, at least one belt-like partition 10 for defining a channel for permeation gas in, for example, a C shape ((a) of FIG. 12), a comb shape (1) ((b) of FIG. 12), an S shape ((c) of FIG. 12), a comb shape (2) ((d) of FIG. 12), or an N shape ((e) of FIG. 12).

Provision of the partition(s) 10 allows mixed gas fed to the separation membrane 2 to contain water vapor in addition to acid gas. This consequently maintains the separation efficiency of acid gas at a high level in a case where the amount of permeate acid gas is larger at higher mixed gas humidity. The reason for this as follows. That is, water vapor in permeation gas, which has permeated through the separation membrane 2, is not collected into the core tube 5 immediately at that part of the permeate-side spatial portion which corresponds to an upstream side of the feed-side spatial portion (lower side of each of (a) to (f) of FIG. 12), but is guided to that part of the permeate-side spatial portion which corresponds to a downstream side of the feed-side spatial portion (upper side of each of (a) to (f) of FIG. 12). This can reduce a low-humidity region in the feed-side spatial portion and the permeate-side spatial portion. The above configuration thus allows mixed gas and permeation gas, which has permeated through the separation membrane 2, to both retain moisture.

The laminate 7 may alternatively contain partitions 10 to define a channel for permeation gas in an S shape ((f) of FIG. 12) which channel is narrow on the upstream side and wide on the downstream side. This allows permeation gas flowing through the permeate-side spatial portion to have a substantially uniform volume flow rate (linear velocity) per unit sectional area over the entire space.

The laminate 7 may contain any number of partitions 10. The laminate 7, however, preferably contains only a few partitions 10, more preferably one or two partitions 10, for a more efficient use of the separation membrane 2. The partition 10 may have any width. The width is, however, preferably small for a more efficient use of the separation membrane 2. The partition 10 may have any length. The partition 10 is, however, preferably long enough to (i) not define a channel through which permeation gas is undesirably collected into the core tube 5 immediately and thereby (ii) prevent water vapor in permeation gas, which has permeated through the separation membrane 2, from being collected into the core tube 5 before reaching that part of the permeate-side spatial portion which corresponds to the downstream side of the feed-side spatial portion. The partition 10 is thus preferably a belt-like member. The partition 10 may be oriented (have a length) in the permeate-side spatial portion to extend parallel with the core tube 5 or orthogonal to the core tube 5. The partition 10 may be formed by any method. The partition 10 is, however, preferably formed with use of the adhesive used to bond the separation membrane 2 and the permeate-side channel component 4 to each other. This allows the partition 10 to be formed efficiently when the separation membrane 2 and the permeate-side channel component 4 are bonded to each other. The partition 10 is thus preferably formed as a belt-like member with use of an epoxy adhesive resin.

[Core Tube 5]

The core tube 5 is a duct for collecting permeation gas, which has permeated through the separation membrane 2, and discharging the permeation gas from the spiral-wound acid gas separation membrane element 1. The core tube 5 may be made of any material. However, since the separation membrane 2 is used at a temperature of not lower than 100° C., the material is preferably heat-resistant. Further, since members such as the separation membrane 2 are wound around the core tube 5 along its outer periphery a plurality of times to provide a wound body, the material preferably has high mechanical strength. A suitable material for the core tube 5 is, for example, stainless steel. The core tube 5 may have a diameter, a length, and a wall thickness that are selected as appropriate depending on, for example, the size of the spiral-wound acid gas separation membrane element 1, the number of membrane leaves, the amount of permeation gas, and/or a mechanical strength required of the core tube 5.

The core tube 5 is preferably (i) a circular duct in a case where the wound body is a cylindrical tube and (ii) an angular duct in a case where the wound body is an angular tube.

The core tube 5 has a group of holes for allowing communication between (i) the permeate-side spatial portion, defined by the permeate-side channel component 4, and (ii) a spatial portion inside the core tube 5. The holes may each have a size selected in view of a mechanical strength required of the core tube 5. In a case where the individual holes cannot be large, the core tube 5 may simply have a larger number of holes.

The core tube 5 may be provided with the group of holes which are formed at uniform intervals in an area corresponding to an entire width of the separation membrane in a laminated state, that is, an entire width of the laminate 7. However, in a case where the partition(s) 10 is provided in the permeate-side spatial portion defined by the separation membrane 2 and the permeate-side channel component 4 which constitute the wound body, the group of holes are preferably present on one end side of the core tube 5. Specifically, the group of holes are present on an end side corresponding to the downstream side of the path in which mixed gas flows through the feed-side spatial portion of the spiral-wound acid gas separation membrane element 1. More specifically, in a case where the partition(s) 10 is formed in the permeate-side spatial portion, the group of holes on the core tube 5 are so present as to be positioned preferably not less than 0.05 W (=0.05×W) and not more than 0.4 W (=0.4×W), more preferably not less than 0.05 W (=0.05×W) and not more than 0.3 W (=0.3×W), from a widthwise end of the separation membrane 2 in the laminated state on the one end side of the core tube 5, where W is the width of the separation membrane 2 in the above laminated state (that is, the length parallel with the flow path of mixed gas).

In a case where the partitions(s) 10 is provided in the permeate-side spatial portion, the group of holes on the core tube 5, which are present within the above range, collect permeation gas. This configuration calls for a longer time period for water vapor present in the spatial portion defined by the permeate-side channel component 4 to be collected into the core tube 5 than a configuration in which a group of holes are distributed all over the core tube 5. The above configuration thus allows mixed gas and permeation gas to both retain moisture, and maintains high efficiency for acid gas separation.

<Acid Gas Separation Membrane Module>

FIG. 1 is a perspective view of an acid gas separation membrane module according to the present invention, the view schematically illustrating a structure of a wound body included in the acid gas separation membrane module as developed and having a partial cutout portion. FIG. 2 is a perspective view of the acid gas separation membrane module, the view schematically illustrating a structure thereof as having a partially developed portion. An acid gas separation membrane module according to the present invention includes, in a housing (container) 15, at least one spiral-wound acid gas separation membrane element 1 illustrated in FIGS. 1 and 2.

As illustrated in FIG. 2, the acid gas separation membrane module M, which is one example of the acid gas separation membrane module according to the present invention, includes, in a housing 15 made of, for example, stainless steel, at least one spiral-wound acid gas separation membrane element 1 including a wound body that includes a laminate 7 of a separation membrane 2, a feed-side channel component 3, and a permeate-side channel component 4, which laminate 7 is wound around a core tube 5 having a plurality of holes (group of holes) 30.

Figure 3:
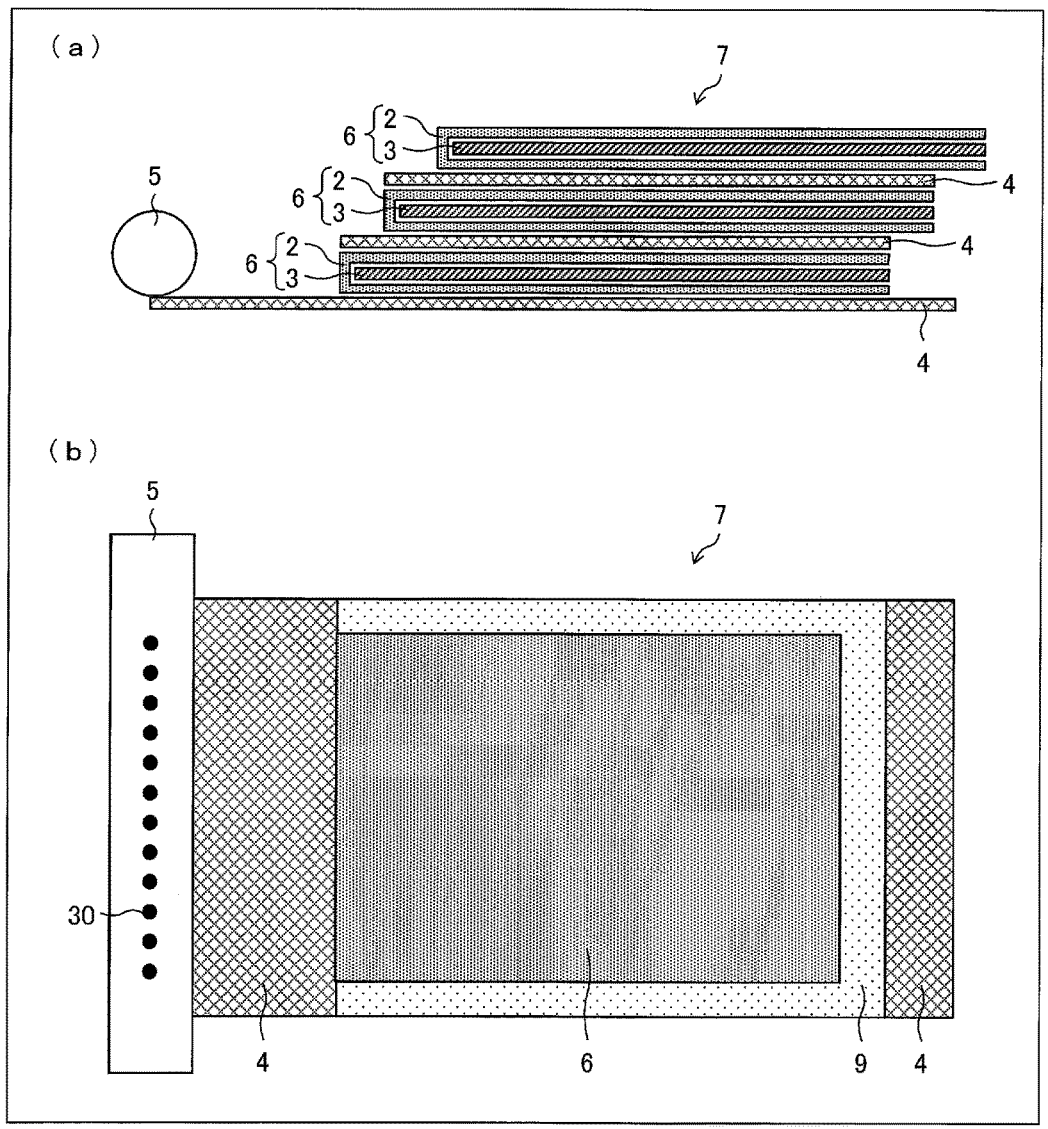
FIG. 3 illustrates a structure as developed of a wound body, where (a) is a cross-sectional view schematically illustrating the structure, and (b) is a plan view schematically illustrating the structure.

With reference to FIG. 3, the description below deals with a method (production process) for producing the spiral-wound acid gas separation membrane element 1, which is one example of the spiral-wound acid gas separation membrane element according to the present invention, and a method for producing an acid gas separation membrane module M, which is one example of the acid gas separation membrane module according to the present invention. Though not illustrated in FIG. 3, the following description deals with an aspect of a structure of a separation membrane element including an element constituent layer including a permeate-side channel component 4, a protective layer 23 and a reinforcement porous membrane 22.

FIG. 3 illustrates a structure as developed of a wound body included in an acid gas separation membrane module according to the present invention, where (a) is a cross-sectional view schematically illustrating the structure, and (b) is a plan view schematically illustrating the structure.

First, a lengthwise end of a long permeate-side channel component 4 is bonded to the outer wall of the core tube 5 with use of, for example, an adhesive.

Next, in a case where the protective layer 23 is structured to have such a width that the protective layer 23 reaches both widthwise terminal ends, a sealing section 25 is provided by filling in a gap between the permeate-side channel component 4 and the separation membrane 2 with an adhesive.

On the other hand, in a case where the protective layer 23 is not structured to have such a width that that the protective layer 23 reaches both widthwise terminal ends, the sealing section 25 is provided by use of the penetration prevention tape 26. The penetration prevention tape 26 is used to prevent entrance/exit of gas into/from the spatial portion defined by the feed-side channel component 3 from being blocked due to penetration of the adhesive into the spatial portion. If the protective layer 23 is made of a material into which the adhesive penetrates, the penetration prevention tape 26 may be used between the feed-side channel component 3 and the sealing section 25.

The adhesive and the penetration prevention tape 26, and a method of using the adhesive and/or the penetration prevention tape 26 are the same as described above in the section with the heading [Sealing Structure].

In a preferred aspect, the adhesive is caused to penetrate into the permeate-side channel component 4 and the reinforcement porous membrane 22 such that high gas tightness is kept.

Then, a plurality of membrane leaves 6 are prepared in each of which a long separation membrane 2 is folded into two parts with the above-prepared separate functional layer 20 inside and with a long feed-side channel component 3 between the two parts.

Next, a membrane leaf 6 is placed on the permeate-side channel component 4 bonded to the outer wall of the core tube 5. For this placement, the crease of the membrane leaf 6 folded into two parts is located on the side of the core tube 5. Further, the crease is apart from the lengthwise end (fixed to the outer wall of the core tube 5) of the permeate-side channel component 4 so that only the permeate-side channel component 4 will be wound around the core tube 5 later. The membrane leaf 6 is, in other words, placed in such a manner that the permeate-side channel component 4 will have a region near the core tube 5 in which region no membrane leaf 6 is placed.

Next, an adhesive is applied to an exposed surface of the membrane leaf 6 (that is, the surface opposite to the permeate-side channel component 4). Specifically, an adhesive is applied to band-like regions along the opposite widthwise ends of the membrane leaf 6 (that is, the ends parallel with the core tube 5) and a lengthwise end (on the side far from the core tube 5) of the membrane leaf 6 (that is, an end orthogonal to the core tube 5). Further, an adhesive is also applied as necessary to a belt-like region in which a partition(s) 10 is to be formed. Subsequently, another permeate-side channel component 4 and another membrane leaf 6 are placed on the exposed surface in this order to be attached thereto. This forms an adhesion section 9, which in turn causes a permeate-side spatial portion to be defined by the permeate-side channel component 4 and forms a partition(s) 10 as necessary. In this case, the another permeate-side channel component 4 and the another membrane leaf 6 are equal in area to or smaller in area than the permeate-side channel component 4 and the membrane leaf 6 which have been immediately previously placed. The another permeate-side channel component 4 is preferably laminated in such a manner that a lengthwise end of the another membrane leaf 6 closer to the core tube 5 is aligned with a lengthwise end of the above immediately previously placed membrane leaf 6. The another membrane leaf 6 is apart from the core tube 5 farther than the immediately previously placed membrane leaf 6 so that only the permeate-side channel component 4 will be wound around the core tube 5.

Further, an adhesive is applied to an exposed surface of the other membrane leaf 6. A further permeate-side channel component 4 and a further membrane leaf 6 are similarly placed on the exposed surface in this order to be attached thereto. The adhesive is applied to a position on the exposed surface of the other membrane leaf 6 which position may either coincide or partially not coincide with the position on the exposed surface of the immediately previously placed membrane leaf 6 to which position the adhesive was applied. A membrane leaf 6 and other members are placed on top repeatedly as described above for attachment of a predetermined number of sets of a membrane leaf 6 and other members to form a laminate 7.

Next, an adhesive is applied to an exposed surface of the membrane leaf 6 placed last. Specifically, an adhesive is applied to band-like regions along the opposite widthwise ends of the membrane leaf 6 and a lengthwise end (on the side far from the core tube 5) of the membrane leaf 6. Further, an adhesive is also applied as necessary to a belt-like region in which a partition(s) 10 is to be formed. Then, the laminate 7 is wound around the core tube 5 in such a manner as to cover the holes 30 of the core tube 5, and respective spaces defined by the permeate-side channel components 4 are closed with use of the outer wall of the core tube 5. This forms a wound body. The laminate 7 is preferably wound around the core tube 5 under tension. Further, preferably, an adhesive is applied in advance to widthwise ends of the permeate-side channel component 4 in a region where the membrane leaf 6 is not placed, when the laminate 7 is wound around the core tube 7.

Next, a reinforcement tape is wound around the wound body along its outer periphery to fix the wound body and prevent the wound body from unwinding. Further, anti-telescoping devices are attached to the opposite ends of the wound body to prevent telescoping from occurring to the wound body during use of the spiral-wound acid gas separation membrane element. In addition, a reinforcement member is further wound around the wound body along its outer periphery. This produces a spiral-wound acid gas separation membrane element 1.

Then, at least one spiral-wound acid gas separation membrane element 1 produced as above is placed inside a housing 15, and an opening for entry or exit of mixed gas and an exit opening for permeation gas are attached to the housing 15. This produces an acid gas separation membrane module M.

<Method of Using Spiral-Wound Acid Gas Separation Membrane Element>

To use a spiral-wound acid gas separation membrane element 1 according to the present invention, the spiral-wound acid gas separation membrane element 1 is installed in a housing 15 to configure an acid gas separation membrane module M. Further, in a case where a partition(s) 10 is provided in the permeate-side spatial portion defined by the separation membrane 2 and the permeate-side channel component 4 which constitutes the wound body, an acid gas separation membrane module M is configured as follows: The spiral-wound acid gas separation membrane element 1 is installed in the housing 15 in such a manner that the end of the core tube 5 at which end the plurality of holes 30 (group of holes) are present is located on the downstream side of the path in which mixed gas flows through the feed-side spatial portion, which is defined by the feed-side channel component 3. The description below deals with a method of using an acid gas separation membrane module M configured as above, and a spiral-wound acid gas separation membrane element.

(Acid Gas Separation Method)

Mixed gas including at least acid gas is continuously fed into the acid gas separation membrane module M through a feed opening 31 (indicated by the arrows A in FIG. 2) corresponding to that part of the feed-side spatial portion defined by each feed-side channel component 3 which corresponds to the upstream side of the acid gas separation membrane module M. Permeation gas, which has permeated through each separation membrane 2, passes through the permeate-side spatial portion defined by the permeate-side channel component 4, and is continuously collected through the holes 30 and a discharge opening (opening section) 32 of the core tube 5 (indicated by the arrow B in FIG. 2). The remaining mixed gas is continuously discharged through a discharge opening 33 (indicated by the arrows C in FIG. 2) corresponding to that part of the feed-side spatial portion defined by each feed-side channel component 3 which corresponds to the downstream side of the acid gas separation membrane module M. This configuration makes it possible to separate acid gas from mixed gas including at least acid gas more efficiently than conventional.

The acid gas separation membrane module M may include any number of spiral-wound acid gas separation membrane elements 1 arranged in any manner depending on the desired recovery ratio of acid gas (=(flow rate of acid gas in permeation gas)/(flow rate of acid gas in mixed gas)× 100). Specifically, acid gas separation membrane modules each including a single spiral-wound acid gas separation membrane element 1 in a housing 15 may be (i) prepared in a number that achieves the desired rate of acid gas collection and (ii) arranged in parallel or in series. The arrangement in parallel refers to a configuration in which at least mixed gas is (i) distributed among a plurality of acid gas separation membrane modules M and (ii) introduced thereinto through a feed opening in each feed-side spatial portion. The arrangement in series refers to a configuration in which at least mixed gas or permeation gas discharged from the discharge opening of the preceding acid gas separation membrane module M is introduced into the subsequent acid gas separation membrane module through its feed opening in a feed-side spatial portion of the subsequent acid gas separation membrane module.

In a case where, for example, a plurality of spiral-wound acid gas separation membrane elements 1 are arranged in parallel, a plurality of acid gas separation membrane modules M each including two spiral-wound acid gas separation membrane elements 1 in a housing 15 are preferably arranged in parallel for an increased efficiency of containing spiral-wound acid gas separation membrane elements 1. In this case, each housing 15 preferably has three openings each for entry or exit of mixed gas (in addition to at least one exit opening for permeation gas).

Specifically, it is preferable that (i) two spiral-wound acid gas separation membrane elements 1 are so contained in each housing 15 as to appear to be arranged in series, that (ii) mixed gas is fed into the two spiral-wound acid gas separation membrane elements 1 in parallel, and that (iii) mixed gas that did not permeate through the separation membranes 2 is discharged. More specifically, in a case where acid gas separation membrane modules M are configured as above, it is preferable that (i) mixed gas is fed through one (entry opening) of the three openings each for entry or exit, whereas mixed gas that did not permeate through the separation membranes 2 is taken out through the other two openings (exit openings) or that (ii) mixed gas is fed through two (entry openings) of the three openings each for entry or exit, whereas mixed gas that did not permeate through the separation membranes 2 is taken out through the other opening (exit opening).

<Acid Gas Separation Apparatus>

An acid gas separation apparatus according to the present invention includes at least one acid gas separation membrane module M configured as above. The acid gas separation apparatus, which includes the acid gas separation membrane module M, can separate acid gas from mixed gas including at least acid gas and water vapor more efficiently than conventional and also save energy.

The present invention is not limited to the description of the embodiments above, but may be altered in various ways by a skilled person within the scope of the claims. Any embodiment based on a proper combination of technical means disclosed in different embodiments is also encompassed in the technical scope of the present invention. Further, combining technical means disclosed in different embodiments can provide a new technical feature.

EXAMPLES

The description below deals in greater detail with the present invention on the basis of Examples. The present invention, however, should not be limited by these Examples.

(Gas Leakage Test of Spiral-Wound Acid Gas Separation Membrane Element 1)

Figure 4:
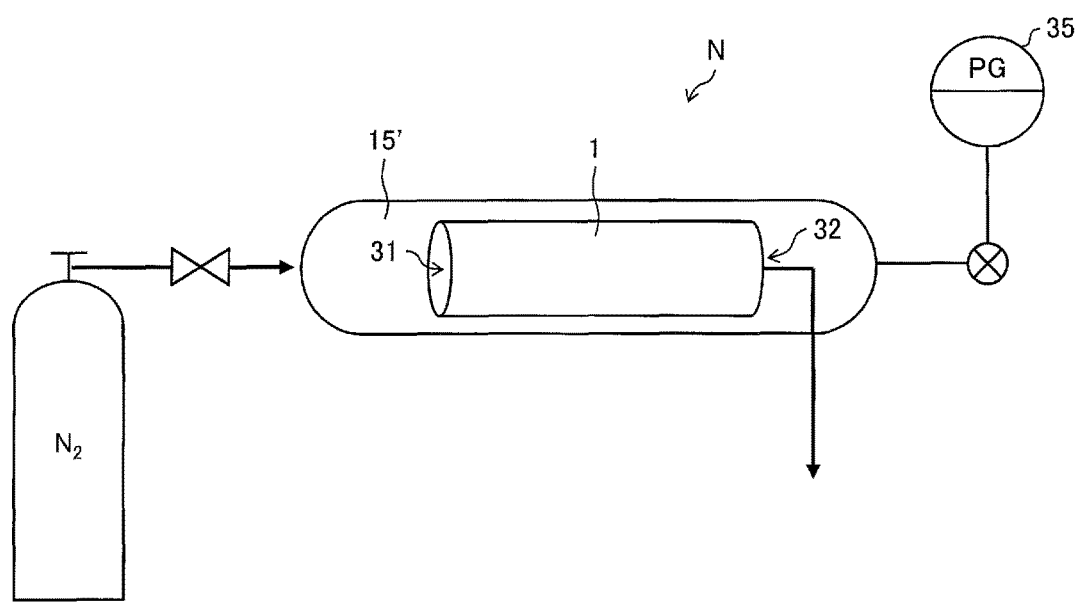
FIG. 4 is a schematic diagram of a testing device for conducting a gas leakage test of a spiral-wound acid gas separation membrane element provided in the acid gas separation membrane module.

A spiral-wound acid gas separation membrane element 1 was fixed inside a stainless-steel housing 15' of a testing device N in such a manner that as illustrated in FIG. 4, the side of the feed opening 31 in the feed-side spatial portion of the spiral-wound acid gas separation membrane element 1 and the side of the discharge opening 32 of the core tube in the spiral-wound acid gas separation membrane element 1 were separated from each other by a separation membrane of the spiral-wound acid gas separation membrane element 1. The core tube extended to the outside of the housing 15' on the side of the discharge opening 32 and was closed on the opposite side. The spiral-wound acid gas separation membrane element 1 had both the feed opening 31 and the other opening (discharge opening) of the feed-side spatial portion, inside of the housing 15'. In other words, gas fed into the housing 15' was flown through both ends (the feed opening side and the discharge opening) of the feed-side spatial portion and discharge opening of the spiral-wound acid gas separation membrane element 1 into the spiral-wound acid gas separation membrane element 1.

Further, a cylinder for feeding nitrogen ($N_2$) gas into the housing 15' was attached to the housing 15' with a valve in-between, and a manometer 35 for measuring the pressure inside the housing 15' was also attached to the housing 15'.

$N_2$ gas having room temperature (20° C.) was fed into the housing 15', and a pressure of 1500 kPaG (where G represents a gage pressure) was applied to the spiral-wound acid gas separation membrane element 1 on the side of the feed opening 31 and the other opening. The pressure was checked with use of the manometer 35. The pressure on the side of the discharge opening 32 of the core tube was adjusted to atmospheric pressure.

After that, a change over time in the pressure inside the housing 15' was measured with use of the manometer 35 while the above state was kept. A gas leakage test of the spiral-wound acid gas separation membrane element 1 was thus performed to evaluate the $N_2$ gas permeation capability of the spiral-wound acid gas separation membrane element 1. Specifically, the permeance of $N_2$ ($mol/m^2$ s kPa) was calculated from the change over time in the pressure measured, and if the permeance was not more than $5\times10^{-8}$ $mol/m^2$ s kPa, the spiral-wound acid gas separation membrane element 1 passed the test, that is, the spiral-wound acid gas separation membrane element 1 was evaluated as keeping gas tightness.

Example 1

A Cs salt type (the term "Cs salt type" refers to a salt in which the "COOH" below is "COOCs") of an acrylic acid-vinyl alcohol copolymer (copolymer of $CH_2$=CH (COOH) and $CH_2$=CH(OH)) was used as a resin for acid gas separation of which resin a separate functional layer 20 of a separation membrane 2 was made. Cesium carbonate ($Cs_2CO_3$) was used as an acid gas carrier.

A PTFE porous membrane (produced by Sumitomo Electric Fine Polymer, Inc.; product name: poreflon HP-010-50, thickness: 50 μm, pore size: 0.1 μm) was used as a support layer 21 for the separation membrane 2.

A separate functional layer 20 was prepared as follows: First, 3 g of a Cs salt type of an acrylic acid-vinyl alcohol copolymer produced by a method disclosed in Japanese Patent No. 5598630 and 7 g of cesium carbonate were added to 80 g of water, and the water was stirred to be mixed. This prepared a coating solution (first step). The amount ratio of the cesium carbonate to the copolymer was 2.3 (g-cesium carbonate/g-copolymer). The coating solution was applied to the PTFE porous membrane to form a coating (second step). The coating solution was applied in such an amount that the weight per unit area was 100 $g/m^2$.

The PTFE porous membrane, on which the coating had been formed, was dried at a temperature of approximately 120° C. for 3 minutes. This prepared a separation membrane (third step).

The separation membrane was then used to prepare a spiral-wound acid gas separation membrane element.

A PPS net (50×50 mesh) (produced by Dio Chemicals, Ltd.; product name: 50-150PPS) was used as a feed-side channel component 3. Three PPS net layers (50×50 mesh/60×40 mesh/50×50 mesh) (produced by Dio Chemicals, Ltd.; product name: 50-150PPS and 60(40)-150PPS) were used as a permeate-side channel component 4. A two-liquid-mixture type epoxy adhesive (produced by Aremco Products, Inc. (US); viscosity: 45,000 cP) was used as an adhesive for forming an adhesion section for a membrane leaf 6. The separation membrane 2 was folded into two parts with the separate functional layer 20 inside and the feed-side channel component 3 between the two parts, and was bonded with use of the adhesive. This prepared a membrane leaf 6.

A stainless steel core tube 5 having an outer diameter of 1 inch was used as a core tube 5 where twenty holes 30 were provided at uniform intervals in an area corresponding to an entire width of the separation membrane in a laminated state. That is, the core tube 5 used was a stainless steel core tube 5' where two rows of ten holes 30 were provided at uniform intervals in an area corresponding to an entire width of the laminate 7 (only ten holes are viewable in FIG. 2, and the other ten holes are present through an outer wall of the core tube 5 on an side opposite to the viewable ten holes via the central axis of the core tube 5). The holes 30 each had a diameter of 3 mm and an interval between adjacent holes 30 aligned in a line was 25.4 mm.

The above-described method (production process) for producing a spiral-wound acid gas separation membrane element (refer to the description above) was used to produce a spiral-wound acid gas separation membrane element. A two-liquid-mixture type epoxy adhesive (produced by Aremco Products, Inc. (US); viscosity: 45,000 cP) was used as an adhesive for bonding the permeate-side channel component 4 to the core tube 5. Further, a glass fiber impregnated with a two-liquid-mixture type epoxy adhesive (produced by Aremco Products, Inc. (US); viscosity: 5,000 cP) was used as a material for reinforcement on an outer periphery of the spiral-wound acid gas separation membrane element. Further, a two-liquid-mixture type epoxy adhesive (produced by Aremco Products, Inc. (US); viscosity: 45,000 cP) was used as an adhesive for sealing a sealing section 25. In a stage of lamination of constituent layers of the separation membrane element, the adhesive was mounted so as to be in contact with widthwise ends of the separation membrane 2, so that a sealing structure was formed. When the adhesive was mounted, a penetration tape 26 was used between the feed-side channel component 3 and the sealing section 25 such that the adhesive would not penetrate into the feed-side channel component 3. Further, the adhesive was caused to penetrate into a surface of the permeate-side channel component 4 so as to provide a seal. The adhesive caused to penetrate here was a two-liquid-mixture type epoxy adhesive (produced by Aremco Products, Inc. (US); viscosity: 45,000 cP). FIG. 5 illustrates sealing structures thus produced.

The spiral-wound acid gas separation membrane element thus prepared had a diameter of 4 inches (102 mm) and a length of 15 inches (381 mm).

The spiral-wound acid gas separation membrane element was subjected to a gas leakage test. Then, the result of this gas leakage test was compared with the permeance of $N_2$ of a spiral-wound acid gas separation membrane element in Comparative Example 1. As a result, it was found that though gas tightness was not kept in Comparative Example 1, gas tightness was kept in Example 1 (in evaluations of 9 trials out of 10 trials performed, gas tightness was kept). Accordingly, it was found that gas tightness was improved by sealing, with use of an adhesive, the sealing section 25 provided at both widthwise ends of the separate functional layer 20.

Example 2

A spiral-wound acid gas separation membrane element was produced as in Example 1 except that a sealing structure was changed to the structure illustrated in FIG. 6. Specifically, the spiral-wound acid gas separation membrane element of Example 2 was configured to further include, in a spiral-wound acid gas separation membrane element of Example 1: a protective layer 23 between a feed-side channel component 3 and a separation membrane 2; and a reinforcement porous membrane 22 between the separation membrane 2 and a permeate-side channel component 4. In addition, the spiral-wound acid gas separation membrane element of Example 2 was configured such that in the spiral-wound acid gas separation membrane element of Example 1, a separate functional layer 20 covers side surfaces (cross sections along a thickness direction) of a support layer 21 at both widthwise ends of the support layer 21.

The spiral-wound acid gas separation membrane element was subjected to a gas leakage test. Then, the result of this gas leakage test was compared with the permeance of $N_2$ of a spiral-wound acid gas separation membrane element in Comparative Example 1. As a result, it was found that though gas tightness was not kept in Comparative Example 1, gas tightness was kept in Example 2 (in evaluations of all 10 trials out of 10 trials performed, gas tightness was kept). Accordingly, it was found that gas tightness was improved by sealing, with use of an adhesive, a sealing section 25 provided at both widthwise ends of the separate functional layer 20.

Example 3

A spiral-wound acid gas separation membrane element was produced as in Example 1 except that a sealing structure was changed to the structure illustrated in FIG. 7. Specifically, the spiral-wound acid gas separation membrane element of Example 3 was configured to further include, in a spiral-wound acid gas separation membrane element of Example 1: a protective layer 23 between a feed-side channel component 3 and a separation membrane 2; and a reinforcement porous membrane 22 between the separation membrane 2 and a permeate-side channel component 4. The spiral-wound acid gas separation membrane element was subjected to a gas leakage test. Then, the result of this gas leakage test was compared with the permeance of $N_2$ of a spiral-wound acid gas separation membrane element in Comparative Example 1. As a result, it was found that though gas tightness was not kept in Comparative Example 1, gas tightness was kept in Example 3 (in evaluations of all 10 trials out of 10 trials performed, gas tightness was kept). Accordingly, it was found that gas tightness was improved by sealing, with use of an adhesive, a sealing section 25 formed at both widthwise ends of the separate functional layer 20.

Comparative Example 1

Figure 8:
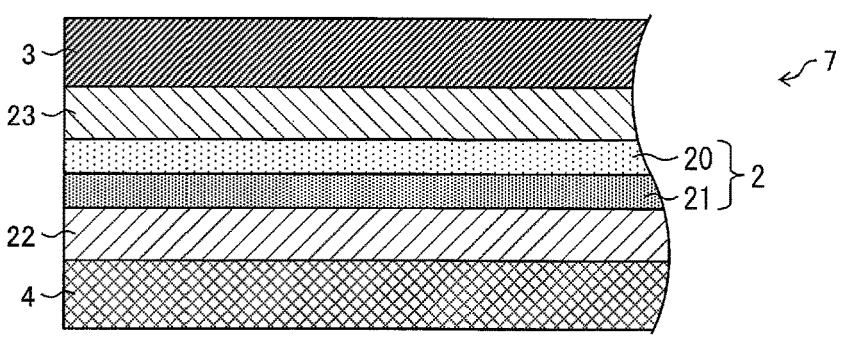
FIG. 8 is a cross-sectional view schematically illustrating a sealing structure of a spiral-wound acid gas separation membrane element according to Comparative Example 1.

A spiral-wound acid gas separation membrane element was produced as in Example 1 except that a sealing structure was changed to the structure illustrated in FIG. 8. Specifically, the spiral-wound acid gas separation membrane element of Comparative Example 1 was configured to further include, in a spiral-wound acid gas separation membrane element of Example 1: a protective layer 23 between a feed-side channel component 3 and a separation membrane 2 and a reinforcement porous membrane 22 between the separation membrane 2 and a permeate-side channel component 4. In Comparative Example 1, since no gap was present between a permeate-side channel component 4 and the separation membrane 2, an adhesive was not mounted. Accordingly, a seal was provided only by causing an adhesive to penetrate from widthwise terminal ends of the permeate-side channel component 4 and the reinforcement porous membrane 22. The adhesive here was a two-liquid-mixture type epoxy adhesive (produced by Aremco Products, Inc. (US); viscosity: 45,000 cP). Then, the spiral-wound acid gas separation membrane element was subjected to a gas leakage test. As a result, it was found that gas tightness was not kept (in no trial out of 10 trials performed, gas tightness was kept). This result of the gas tight test is explained as follows: in observation of a cross section of the spiral-wound acid gas separation membrane element under a scanning electron microscope (SEM), it was found that (i) the adhesive had not penetrated into the porous membrane that was the support layer, and (ii) this caused fed $N_2$ gas to leak into a core tube and reach a side of a discharge opening 32 of the core tube through the porous membrane but not via the separation membrane.

Example 4

A Cs salt type (the term "Cs salt type" refers to a salt in which the "COOH" above is "COOCs") of an acrylic acid-vinyl alcohol copolymer (copolymer of $CH_2$=CH (COOH) and $CH_2$=CH(OH)) was used as a resin for acid gas separation of which resin a separate functional layer 20 of a separation membrane 2 was made. Cesium carbonate ($Cs_2CO_3$) was used as an acid gas carrier.

A PTFE porous membrane (produced by Sumitomo Electric Fine Polymer, Inc.; product name: poreflon HP-010-50, thickness: 50 μm, pore size: 0.1 μm) was used as a support layer 21 for the separation membrane 2.

A separate functional layer 20 was prepared as follows: First, 3 g of a Cs salt type of an acrylic acid-vinyl alcohol copolymer produced by a method disclosed in Japanese Patent No. 5598630 and 7 g of cesium carbonate were added to 80 g of water, and the water was stirred to be mixed. This prepared a coating solution (first step). The amount ratio of the cesium carbonate to the copolymer was 2.3 (g-cesium carbonate/g-copolymer). The coating solution was applied to the PTFE porous membrane to form a coating (second step). The coating solution was applied in such an amount that the weight per unit area was 100 g/m$^2$.

The PTFE porous membrane, on which the coating had been formed, was dried at a temperature of approximately 120° C. for 3 minutes. This prepared a separation membrane (third step).

The separation membrane was then used to prepare a spiral-wound acid gas separation membrane element.

A PPS net (50×50 mesh) (produced by Dio Chemicals, Ltd.; product name: 50-150PPS) was used as a feed-side channel component 3. Moreover, a protective layer 23 was provided between the feed-side channel component 3 and the separation membrane 2. As the protective layer 23, a PPS nonwoven fabric (produced by Hirose Paper Mfg. Co., Ltd.; the weight per unit area of 80 g/m$^2$) was used. Three PPS net layers (50×50 mesh/60×40 mesh/50×50 mesh) (produced by Dio Chemicals, Ltd.; product name: 50-150PPS and 60(40)-150PPS) were used as a permeate-side channel component 4. Furthermore, a reinforcement porous membrane 22 was provided between the permeate-side channel component 4 and the separation membrane 2. As the reinforcement porous membrane 22, a PPS nonwoven fabric (produced by Hirose Paper Mfg. Co., Ltd.; the weight per unit area of 80 g/m$^2$) was used. A two-liquid-mixture type epoxy adhesive (produced by Aremco Products, Inc. (US); viscosity: 45,000 cP) was used as an adhesive for forming an adhesion section for a membrane leaf 6. The separation membrane 2 and the protective layer 23 were folded into two parts with the separate functional layer 20 inside and the feed-side channel component 3 between the two parts, and was bonded with use of the adhesive. This prepared a membrane leaf 6.

A stainless steel core tube 5 having an outer diameter of 1 inch was used as a core tube 5 where twenty holes 30 were provided at uniform intervals in an area corresponding to an entire width of the separation membrane in a laminated state. That is, the core tube 5 used was a stainless steel core tube 5' where two rows of ten holes 30 were provided at uniform intervals in an area corresponding to an entire width of the laminate 7 (only ten holes are viewable in FIG. 2, and the other ten holes are present through an outer wall of the core tube 5 on an side opposite to the viewable ten holes via the central axis of the core tube 5). The holes 30 each had a diameter of 3 mm and an interval between adjacent holes 30 aligned in a line was 25.4 mm.

The above-described method (production process) for producing a spiral-wound acid gas separation membrane element (refer to the description above) was used to produce a spiral-wound acid gas separation membrane element. A two-liquid-mixture type epoxy adhesive (produced by Aremco Products, Inc. (US); viscosity: 45,000 cP) was used as an adhesive for bonding the permeate-side channel component 4 to the core tube 5. Further, a glass fiber impregnated with a two-liquid-mixture type epoxy adhesive (produced by Aremco Products, Inc. (US); viscosity: 5,000 cP) was used as a material for reinforcement on an outer periphery of the spiral-wound acid gas separation membrane element. Further, a two-liquid-mixture type epoxy adhesive (produced by Aremco Products, Inc. (US); viscosity: 45,000 cP) was used as an adhesive for sealing a sealing section 25. In a stage of lamination of constituent layers of the separation membrane element, the adhesive was mounted so as to be in contact with widthwise ends of the separation membrane 2. At the same time, an adhesive was provided such that the adhesive caused to penetrate into the protective layer 23 and the reinforcement porous membrane 22 reached inner areas in a width direction beyond imaginary lines obtained by extending in a thickness direction widthwise ends of the separation membrane 2. Thereby, a sealing structure was formed. When the adhesive was mounted/provided, a penetration tape 26 was used between the feed-side channel component 3 and the protective layer 23 such that the adhesive would not penetrate into the feed-side channel component 3. Further, the adhesive was caused to penetrate into a surface of the permeate-side channel component 4 so as to provide a seal. The adhesive caused to penetrate here was a two-liquid-mixture type epoxy adhesive (produced by Aremco Products, Inc. (US); viscosity: 45,000 cP). FIG. 13 illustrates sealing structures thus produced.

The spiral-wound acid gas separation membrane element thus prepared had a diameter of 4 inches (102 mm) and a length of 15 inches (381 mm).

The spiral-wound acid gas separation membrane element was subjected to a gas leakage test. Then, the result of this gas leakage test was compared with the permeance of $N_2$ of a spiral-wound acid gas separation membrane element in Comparative Example 1. As a result, it was found that though gas tightness was not kept in Comparative Example 1, gas tightness was kept in Example 4 (in evaluations of all 10 trials out of 10 trials performed, gas tightness was kept). Further, the spiral-wound acid gas separation membrane element having been subjected to the gas leakage test was broken down. Then, a cross section of the sealing section was observed under a microscope. As a result, it was confirmed that the adhesive penetration section 27 of the element constituent layer had reached the inner areas in a width direction beyond the imaginary lines obtained by extending in a thickness direction the widthwise ends of the separation membrane 2. Accordingly, it was found that gas tightness was improved by sealing, with use of an adhesive, the sealing section 25 provided at both widthwise ends of the separate functional layer 20 and additionally providing the adhesive penetration section 27 in an element constituent layer.

Example 5

A spiral-wound acid gas separation membrane element was produced as in Example 4 except that a sealing structure was changed to the structure illustrated in FIG. 14. Specifically, the spiral-wound acid gas separation membrane element of Example 5 was produced as in Example 4 except that after formation of the separation membrane 2, widthwise-end areas of the support layer 21 was subjected to hydrophilic treatment by applying solution containing a surface active agent to widthwise-end areas of the separation membrane 2 from a side where the support layer 21 of the separation membrane 2 was provided, and naturally drying the solution for one hour. A nonionic surface active agent (manufactured by AGC Seimi Chemical Co., Ltd.: SURFLON S-242) was used as the surface active agent. The solution used was prepared by mixing this surface active agent and water at the ratio of 1:1. The spiral-wound acid gas separation membrane element was subjected to a gas leakage test. Then, the result of this gas leakage test was compared with the permeance of $N_2$ of a spiral-wound acid gas separation membrane element in Comparative Example 1. As a result, it was found that though gas tightness was not kept in Comparative Example 1, gas tightness was kept in Example 5 (in evaluations of all 10 trials out of 10 trials performed, gas tightness was kept). Further, the spiral-wound acid gas separation membrane element having been subjected to the gas leakage test was broken down. Then, a cross section of the sealing section was observed under a microscope. As a result, it was confirmed that as illustrated in FIG. 14, an adhesive had penetrated into the widthwise-end areas of the support layer in addition to a sealing structure as illustrated in FIG. 13. Accordingly, it was found that gas tightness was improved by sealing, with use of an adhesive, a sealing section 25 provided at both widthwise ends of the separate functional layer 20 and additionally providing an adhesive penetration section 27 in an element constituent layer.

Example 6

A spiral-wound acid gas separation membrane element was produced as in Example 4 except that a sealing structure was changed to the structure illustrated in FIG. 15. Specifically, the protective layer 23 in the spiral-wound acid gas separation membrane element of Example 4 was arranged in Example 6 to have a two-layer structure. Here, two layers constituting a protective layer 23 are referred to as a protective layer a and a protective layer b, respectively. As the protective layer, a PPS nonwoven fabric and a PTFE porous membrane (produced by Sumitomo Electric Fine Polymer, Inc.; product name: poreflon HP-010-50, thickness: 50 µm, pore size: 0.1 µm) were used. Further, the PTFE porous membrane was arranged to have the same width as a separation membrane 2. The spiral-wound acid gas separation membrane element was subjected to a gas leakage test. Then, the result of this gas leakage test was compared with the permeance of $N_2$ of a spiral-wound acid gas separation membrane element in Comparative Example 1. As a result, it was found that though gas tightness was not kept in Comparative Example 1, gas tightness was kept in Example 6 (in evaluations of all 10 trials out of 10 trials performed, gas tightness was kept). Further, the spiral-wound acid gas separation membrane element having been subjected to the gas leakage test was broken down. Then, a cross section of the sealing section was observed under a microscope. As a result, it was confirmed that an adhesive penetration section 27 had not extended to a portion made of the PTFE porous membrane in the protective layer but had extended into the other constituent layers so as to reach inner areas in a width direction beyond imaginary lines obtained by extending in a thickness direction widthwise ends of a separation membrane 2. Accordingly, it was found that gas tightness was improved by sealing, with use of an adhesive, a sealing section 25 provided at both widthwise ends of the separate functional layer 20 and additionally providing the adhesive penetration section 27 in an element constituent layer.

Example 7

A spiral-wound acid gas separation membrane element was produced as in Example 6 except that a sealing structure was changed to the structure illustrated in FIG. 16. Specifically, the spiral-wound acid gas separation membrane element of Example 7 was produced as in Example 6 except that widthwise ends of the protective layer made of a PTFE porous membrane in the spiral-wound acid gas separation membrane element of Example 6 was subjected to hydrophilic treatment with a surface active agent. The hydrophilic treatment was carried out as in Example 5. The spiral-wound acid gas separation membrane element was subjected to a gas leakage test. Then, the result of this gas leakage test was compared with the permeance of $N_2$ of a spiral-wound acid gas separation membrane element in Comparative Example 1. As a result, it was found that though gas tightness was not kept in Comparative Example 1, gas tightness was kept in Example 7 (in evaluations of all 10 trials out of 10 trials performed, gas tightness was kept). Further, the spiral-wound acid gas separation membrane element having been subjected to the gas leakage test was broken down. Then, a cross section of the sealing section was observed under a microscope. As a result, it was confirmed that an adhesive penetration section 27 had extended into an element constituent layer so as to reach inner areas in a width direction beyond imaginary lines obtained by extending in a thickness direction widthwise ends of a separation membrane 2. Accordingly, it was found that gas tightness was improved by sealing, with use of an adhesive, a sealing section 25 provided at both widthwise ends of the separation membrane 2 and additionally providing the adhesive penetration section 27 in the element constituent layer.

Example 8

A spiral-wound acid gas separation membrane element was produced as in Example 6 except that a sealing structure was changed to the structure illustrated in FIG. 17. Specifically, the spiral-wound acid gas separation membrane element of Example 8 was produced as in Example 6 except that widthwise ends of the protective layer made of a PTFE porous membrane and widthwise ends of the support layer 21 in the spiral-wound acid gas separation membrane element of Example 6 was subjected to hydrophilic treatment with a surface active agent. The hydrophilic treatment was carried out as in Example 5. The spiral-wound acid gas separation membrane element was subjected to a gas leakage test. Then, the result of this gas leakage test was compared with the permeance of $N_2$ of a spiral-wound acid gas separation membrane element in Comparative Example 1. As a result, it was found that though gas tightness was not kept in Comparative Example 1, gas tightness was kept in Example 8 (in evaluations of all 10 trials out of 10 trials performed, gas tightness was kept). Further, the spiral-wound acid gas separation membrane element having been subjected to the gas leakage test was broken down. Then, a cross section of the sealing section was observed under a microscope. As a result, it was confirmed that an adhesive penetration section 27 had extended into an element constituent layer and a support layer 21 so as to reach inner areas in a width direction beyond imaginary lines obtained by extending in a thickness direction widthwise ends of a separation membrane 2. Accordingly, it was found that gas tightness was improved by sealing, with use of an adhesive, a sealing section 25 provided at both widthwise ends of the separate functional layer 20 and additionally providing the adhesive penetration section 27 in the element constituent layer.

CONCLUSION

The result of a comparison between Examples 1 through 8 and Comparative Example 1 showed that the spiral-wound acid gas separation membrane elements each provided with the sealing section at respective widthwise ends of the separate functional layer were superior in gas tightness than the spiral-wound acid gas separation membrane element which does not include the sealing section.

INDUSTRIAL APPLICABILITY

A spiral-wound acid gas separation membrane element according to the present invention, an acid gas separation membrane module according to the present invention, and an acid gas separation apparatus according to the present invention has a high gas tightness and can not only separate acid gas from mixed gas including at least acid gas more efficiently than conventional one but also save energy. Therefore, the spiral-wound acid gas separation membrane element, the acid gas separation membrane module, and the acid gas separation apparatus each can be widely used in a process of separating acid gas such as $CO_2$ from such mixed gas including at least acid gas as (i) synthesis gas synthesized in a large-scale plant that produces, for example, hydrogen and/or urea, (ii) natural gas, and (iii) exhaust gas.

REFERENCE SIGNS LIST 1 spiral-wound acid gas separation membrane element
2 separation membrane
3 feed-side channel component
4 permeate-side channel component
5 core tube
6 membrane leaf
7 laminate
9 adhesion section
10 partition
15 housing
20 separate functional layer
21 support layer
22 reinforcement porous membrane
23 protective layer
23a protective layer a
23b protective layer b
25 sealing section
26 penetration prevention tape
27 adhesive penetration section
30 hole
M acid gas separation membrane module

The invention claimed is:
1. A spiral-wound acid gas separation membrane element comprising:
  a wound body including:
    a separation membrane;
    a feed-side channel component;
    a permeate-side channel component;
    a sealing section; and
    a perforated core tube,
  the separation membrane, the feed-side channel component, and the permeate-side channel component being in a laminated state and wound around the perforated core tube,
  the separation membrane including:
    a separate functional layer including:
      an acid gas carrier that reversibly reacts with acid gas; and
      an acid gas separation membrane resin; and
    a support layer including a porous membrane,
  the permeate-side channel component being greater at least in an across-the-width direction of the permeate-side channel component than the separation membrane, and
  the sealing section being provided at each of both widthwise ends of the separation membrane, for filling in a gap formed between the permeate-side channel component and the separation membrane.

2. The spiral-wound acid gas separation membrane element according to claim 1, further comprising at least one selected from the group consisting of:
  at least one protective layer provided between the separation membrane and the feed-side channel component; and
  at least one reinforcement porous membrane provided as a layer on a permeate side of the separation membrane.

3. The spiral-wound acid gas separation membrane element according to claim 1, wherein
  the sealing section is an adhesive layer.

4. The spiral-wound acid gas separation membrane element according to claim 3, wherein
  the adhesive layer contains an epoxy adhesive resin.

5. The spiral-wound acid gas separation membrane element according to claim 1, wherein
  the support layer is a porous membrane made of a fluorine-containing resin.

6. The spiral-wound acid gas separation membrane element according to claim 1, further comprising another sealing section into which an adhesive has been caused to penetrate, the another sealing section being provided in both widthwise-end continuous areas of an element constituent layer, the widthwise-end continuous areas each extending from a corresponding widthwise end of the element constituent layer and reaching a corresponding one of imaginary lines obtained by extending in a thickness direction widthwise ends of the separation membrane,
  the element constituent layer including at least one selected from the group consisting of the permeate-side channel component, at least one protective layer provided between the separation membrane and the feed-side channel component, and at least one reinforcement porous membrane provided as a layer on a permeate side of the separation membrane.

7. The spiral-wound acid gas separation membrane element according to claim 6, wherein
  in the another sealing section, the adhesive has been caused to penetrate into inner areas in a width direction beyond the imaginary lines obtained by extending in a thickness direction the widthwise ends of the separation membrane.

8. The spiral-wound acid gas separation membrane element according to claim 1, wherein the protective layer has widthwise ends treated with a hydrophilic treatment agent.

9. The spiral-wound acid gas separation membrane element according to claim 1, further comprising still another sealing section into which an adhesive has been caused to penetrate, in widthwise-end areas of the support layer.

10. The spiral-wound acid gas separation membrane element according to claim 9, wherein
  the still another sealing section is treated with a hydrophilic treatment agent.

11. The spiral-wound acid gas separation membrane element according to claim 8, wherein
  the hydrophilic treatment agent is a surface active agent.

12. An acid gas separation membrane module comprising:
  at least one spiral-wound acid gas separation membrane element according to claim 1; and
  a housing,
  the at least one spiral-wound acid gas separation membrane element being provided in the housing.

13. An acid gas separation apparatus comprising at least one acid gas separation membrane module according to claim 12.

14. The spiral-wound acid gas separation membrane element according to claim 10, wherein
the hydrophilic treatment agent is a surface active agent.

15. A sealing method used for a spiral-wound acid gas separation membrane element including a wound body,
the wound body including:
a separation membrane;
a feed-side channel component;
a permeate-side channel component;
a sealing section; and
a perforated core tube,
the separation membrane, the feed-side channel component, and the permeate-side channel component being in a laminated state and wound around the perforated core tube,
the separation membrane including:
a separate functional layer including:
an acid gas carrier that reversibly reacts with acid gas; and
an acid gas separation membrane resin; and
a support layer including a porous membrane,
the sealing method comprising the step of:
applying an adhesive to both widthwise ends of the separation membrane so as to fill in a gap formed between the permeate-side channel component and the separation membrane, the permeate-side channel component being greater at least in an across-the-width direction of the permeate-side channel component than the separation membrane.

16. The sealing method as set forth in claim 15, wherein the spiral-wound acid gas separation membrane element further includes at least one selected from the group consisting of:

at least one protective layer provided between the separation membrane and the feed-side channel component; and
at least one reinforcement porous membrane provided as a layer on a permeate side of the separation membrane.

17. The sealing method according to claim 15, further comprising the step of applying an adhesive such that the adhesive penetrates into both widthwise-end continuous areas of an element constituent layer, the widthwise-end continuous areas each extending from a corresponding widthwise end of the element constituent layer and reaching a corresponding one of imaginary lines obtained by extending in a thickness direction widthwise ends of the separation membrane,
the element constituent layer including at least one selected from the group consisting of the permeate-side channel component, at least one protective layer provided between the separation membrane and the feed-side channel component, and at least one reinforcement porous membrane provided as a layer on a permeate side of the separation membrane.

18. The sealing method according to claim 15, further comprising the step of applying an adhesive to both widthwise ends of the support layer.

19. The sealing method according to claim 15, further comprising the step of treating, with a hydrophilic treatment agent, widthwise ends of at least one of the protective layer and the support layer, in advance of application of an adhesive.

20. The sealing method according to claim 19, wherein the hydrophilic treatment agent is a surface active agent.

* * * * *